US012734628B2

(12) United States Patent
Sarratt et al.

(10) Patent No.: US 12,734,628 B2
(45) Date of Patent: Sep. 15, 2026

(54) TURBINE COMPONENT HANDLING SYSTEM FOR COMPUTERIZED MACHINING SYSTEM

(71) Applicant: General Electric Company, Schenectady, NY (US)

(72) Inventors: Craig Sarratt, Greenville, SC (US); Mark Kromer, Simpsonville, SC (US); Timothy Austin Cadden, Greenville, SC (US); Jason Palmer, Marietta, SC (US); Martin Otto, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 527 days.

(21) Appl. No.: 18/325,658

(22) Filed: May 30, 2023

(65) Prior Publication Data

US 2024/0399519 A1 Dec. 5, 2024

(51) Int. Cl.
*B23Q 7/04* (2006.01)
*B23P 15/02* (2006.01)
*B25J 11/00* (2006.01)

(52) U.S. Cl.
CPC .............. *B23Q 7/046* (2013.01); *B23P 15/02* (2013.01); *B25J 11/005* (2013.01)

(58) Field of Classification Search
CPC ............................... B25J 9/0096; B25J 11/00; B25J 11/005–007; B25J 15/0004;
(Continued)

(56) References Cited

U.S. PATENT DOCUMENTS 8,092,357 B1 1/2012 Buus
2017/0173789 A1* 6/2017 Kilibarda ............... B25J 13/085
2021/0039214 A1 2/2021 Ochi

FOREIGN PATENT DOCUMENTS

CN 109664111 A * 4/2019 ........... F01D 25/285
EP 2952291 A1 12/2015
(Continued)

OTHER PUBLICATIONS

CN 109664111A—Machine Translation. Espacenet.com.*
(Continued)

*Primary Examiner* — Tyrone V Hall, Jr.
(74) *Attorney, Agent, or Firm* — James Pemrick; Charlotte Wilson; Hoffman Warnick LLC

(57) ABSTRACT

A handling system for a turbine component and a computerized machining system are provided. A gripper of the system includes a mounting arm operatively coupled to a tool handler of the machining system, a plurality of contact members configured to collectively grasp the turbine component, and a first actuator configured to move at least one of the contact members between a release position in which the contact members receive a part of the turbine component therebetween at a first longitudinal position thereof and a grasp position in which the contact members grasp the part at a second longitudinal position thereof different than the first longitudinal position. The tool handler and/or the turbine component is linearly moved to move the gripper relative to the turbine component between the first longitudinal position and the second longitudinal position. A loading system allowing easier loading/unloading of the turbine component may also be provided.

20 Claims, 21 Drawing Sheets

(58) Field of Classification Search
CPC .......................... B25J 15/0028; B25J 15/0033; B25J 15/0042; B25J 15/009; B23Q 3/06; B23Q 3/063; B23Q 1/01–017; B23Q 1/74; B23Q 7/001; B23Q 7/04; B23Q 7/041; B23Q 7/045
See application file for complete search history.

(56) References Cited

FOREIGN PATENT DOCUMENTS

| | | | | |
|---|---|---|---|---|
| EP | 4015143 A1 * | 6/2022 | ............... | B23Q 7/04 |
| KR | 20100064035 A | 6/2010 | | |
| WO | 2021012943 A1 | 1/2021 | | |

OTHER PUBLICATIONS https://www.haascnc.com/machines/vertical-mills.html.
European Search Report for corresponding EP Application No. 24174403.6-1103 dated Oct. 18, 2024, 9 pages.

* cited by examiner

TURBINE COMPONENT HANDLING SYSTEM FOR COMPUTERIZED MACHINING SYSTEM

TECHNICAL FIELD

The disclosure relates generally to part handling and machining. More specifically, the disclosure relates to a handling system for a turbine component for a computerized machining system.

BACKGROUND

Computer numerical control (CNC) machining systems automatically machine metal or other rigid material components using a computer. The CNC machining system processes the component to meet specifications by following a set of program instructions and without an operator manually controlling the machining operation. The machining system typically includes a component fixture that holds and moves the component as the machining occurs, e.g., in any direction in a horizontal, vertical and/or tilting manner. The component fixture is oftentimes positioned within a machine enclosure in which work on the component is performed. The machine enclosure may have automated doors that open and close before and after machining. A tool handler can select from a number of tools, e.g., on a tool carrier. The computer controls operation and positioning of the tools and the component relative to one another via the tool holder and/or the component fixture during automated machining of the component. The tools may take a variety of forms such as but not limited to: tools for physically changing the component such as milling, drilling, tapping, boring, abrading, etc.; tools for confirming position of the component and/or accuracy of the machining such as physical or optical probes; and tools for post-machining processing like cleaning machining debris, removing contaminants and/or drying the component such as air jets or high-speed fans. During operation, some machining requires a coolant for the machining tool and/or the component. In this case, the machining tool may include a coolant delivery system (e.g., a pump, conduit, and nozzle) to deliver a coolant to the machining tool and/or the component.

Loading and unloading components that are heavy or have a complex shape to the component fixture can be a challenge. For example, where a machine enclosure is used, positioning the component on the component fixture may require a user to manually lift the component and reach to place the component on the component fixture by, for example, bending over and/or extending their arms into the machine enclosure while holding the component. One example component that may be heavy and/or have a complex shape includes a turbine component with an airfoil such as a turbine blade or nozzle.

BRIEF DESCRIPTION

All aspects, examples and features mentioned below can be combined in any technically possible way.

An aspect of the disclosure provides a handling system for a turbine component relative to a computerized machining system, the handling system comprising: a gripper including: a mounting arm configured to be operatively coupled to a tool handler of the computerized machining system; a plurality of contact members configured to collectively grasp the turbine component, and a first actuator configured to move at least one of the plurality of contact members between a release position in which the plurality of contact members receive a part of the turbine component therebetween at a first longitudinal position of the part of the turbine component and a grasp position in which the plurality of contact members grasp the part of the turbine component at a second longitudinal position of the part different than the first longitudinal position, wherein at least one of the tool handler and the turbine component is linearly moved to move the gripper relative to the turbine component between the first longitudinal position and the second longitudinal position.

Another aspect of the disclosure includes any of the preceding aspects, and further comprising a loading system including a loading platform and a second actuator configured to move the loading platform between a user-access position distal from a component fixture of the computerized machining system and a loading position proximate the component fixture of the computerized machining system.

Another aspect of the disclosure includes any of the preceding aspects, and further comprising one or more linear guide tracks mounting the loading platform for lateral movement relative to the component fixture, wherein the second actuator includes a linear actuator configured to move the loading platform between the user-access position and the loading position along the one or more linear guide tracks.

Another aspect of the disclosure includes any of the preceding aspects, and, in the user-access position, the loading platform is at least partially outside a machine enclosure of the computerized machining system and, in the loading position, the loading platform is inside the machine enclosure of the computerized machining system.

Another aspect of the disclosure includes any of the preceding aspects, and, with the loading platform in the loading position, the tool handler moves the gripper between: a first handler position over the loading platform in which the gripper moves between the release position and the grasp position to grasp or ungrasp the turbine component for movement of the turbine component to or from the loading platform; and a second handler position over the component fixture in which the gripper moves between the release position and the grasp position to grasp or ungrasp the turbine component for movement of the turbine component to or from the component fixture.

Another aspect of the disclosure includes any of the preceding aspects, and the loading platform moves between the user-access position and the loading position and the gripper moves between the first handler position, the second handler position, the release position and the grasp position in an automated manner as part of a set of component machining instructions for the computerized machining system.

Another aspect of the disclosure includes any of the preceding aspects, and, with the loading platform in the loading position, the tool handler moves the gripper between: a first handler position over the loading platform in which the gripper moves between the release position and the grasp position to grasp or ungrasp the turbine component for movement of the turbine component to or from the loading platform; and a second handler position over the component fixture in which the gripper moves between the release position and the grasp position to grasp or ungrasp the turbine component for movement of the turbine component to or from the component fixture.

Another aspect of the disclosure includes any of the preceding aspects, and, with the loading platform in the user-access position, the turbine component is free to be manually moved by a user.

Another aspect of the disclosure includes any of the preceding aspects, and the second longitudinal position of the turbine component includes a center of gravity of the turbine component.

Another aspect of the disclosure includes any of the preceding aspects, and the first actuator includes a pneumatic actuator.

Another aspect of the disclosure includes any of the preceding aspects, and the plurality of contact members includes: a first fixed contact member and a second fixed contact member, the first and second fixed contact members distanced apart to allow passage of the part of the turbine component therebetween at the first longitudinal position of the part and prevent passage of the part of the turbine component therebetween at the second longitudinal position; and a moveable contact member operatively coupled to the first actuator to selectively cause grasping of the turbine component by the plurality of contact members in the second longitudinal position.

Another aspect of the disclosure includes any of the preceding aspects, and the turbine component includes a turbine blade or nozzle, and the part of the turbine component includes an airfoil.

An aspect of the disclosure includes an automated method of handling a turbine component relative to a computerized machining system, the automated method comprising: positioning a loading platform in a user-access position distal from a component fixture of the computerized machining system, whereby a user manually loads the turbine component to the loading platform; positioning the loading platform with the turbine component in a loading position proximate the component fixture; moving the turbine component from the loading platform to a component fixture of the computerized machining system using a gripper having a plurality of contact members configured to collectively grasp the turbine component, the gripper operatively coupled to a tool handler of the computerized machining system; and machining the turbine component using the computerized machining system and a set of component machining instructions.

Another aspect of the disclosure includes any of the preceding aspects, and further comprising, after the machining: moving the turbine component from the component fixture of the computerized machining system to the loading platform using the gripper operatively coupled to the tool handler of the computerized machining system; and positioning the loading platform in the user-access position distal from the component fixture of the computerized machining system, whereby a user manually unloads the turbine component from the loading platform.

Another aspect of the disclosure includes any of the preceding aspects, and the gripper includes a first actuator configured to move at least one of the plurality of contact members between a release position in which the plurality of contact members receive a part of the turbine component therebetween at a first longitudinal position of the part of the turbine component and a grasp position in which the plurality of contact members grasp the part of the turbine component at a second longitudinal position of the part different than the first longitudinal position, and further comprising linearly moving at least one of the tool handler and the turbine component to move the gripper relative to the turbine component between the first longitudinal position and the second longitudinal position.

Another aspect of the disclosure includes any of the preceding aspects, and the second longitudinal position of the turbine component includes a center of gravity of the turbine component.

Another aspect of the disclosure includes any of the preceding aspects, and further comprising one or more linear guide tracks for mounting the loading platform for lateral movement relative to the component fixture, and further comprising a second actuator configured to move the loading platform between the user-access position and the loading position along the one or more linear guide tracks.

Another aspect of the disclosure includes any of the preceding aspects, and, in the user-access position, the loading platform is at least partially outside a machine enclosure of the computerized machining system and, in the loading position, the loading platform is inside the machine enclosure of the computerized machining system.

Another aspect of the disclosure includes any of the preceding aspects, and, with the loading platform in the loading position, the tool handler moves the gripper between: a first handler position over the loading platform in which the gripper moves between the release position and the grasp position to grasp or ungrasp the turbine component for movement of the turbine component to or from the loading platform; and a second handler position over the component fixture in which the gripper moves between the release position and the grasp position to grasp or ungrasp the turbine component for movement of the turbine component to or from the component fixture.

An aspect of the disclosure includes a gripper for a handling system for a turbine component including an airfoil, the gripper comprising: a mounting arm configured to be operatively coupled to a tool handler of a computerized machining system; a first contact member fixed relative to the mounting arm; a second contact member fixed relative to the mounting arm, the first and second contact members distanced apart to allow passage of the airfoil therebetween at a first longitudinal position of the airfoil having a first width and prevent passage of the airfoil therebetween at a second longitudinal position of the airfoil having a second, wider width than the first width; a third contact member moveable between a grasp position contacting a portion of the turbine component and seating the turbine component against the first and second contact members and a release position out of contact with the turbine component and allowing movement of the turbine component relative to the first and second contact members; and an actuator moving the third contact member between the grasp position and the release position.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
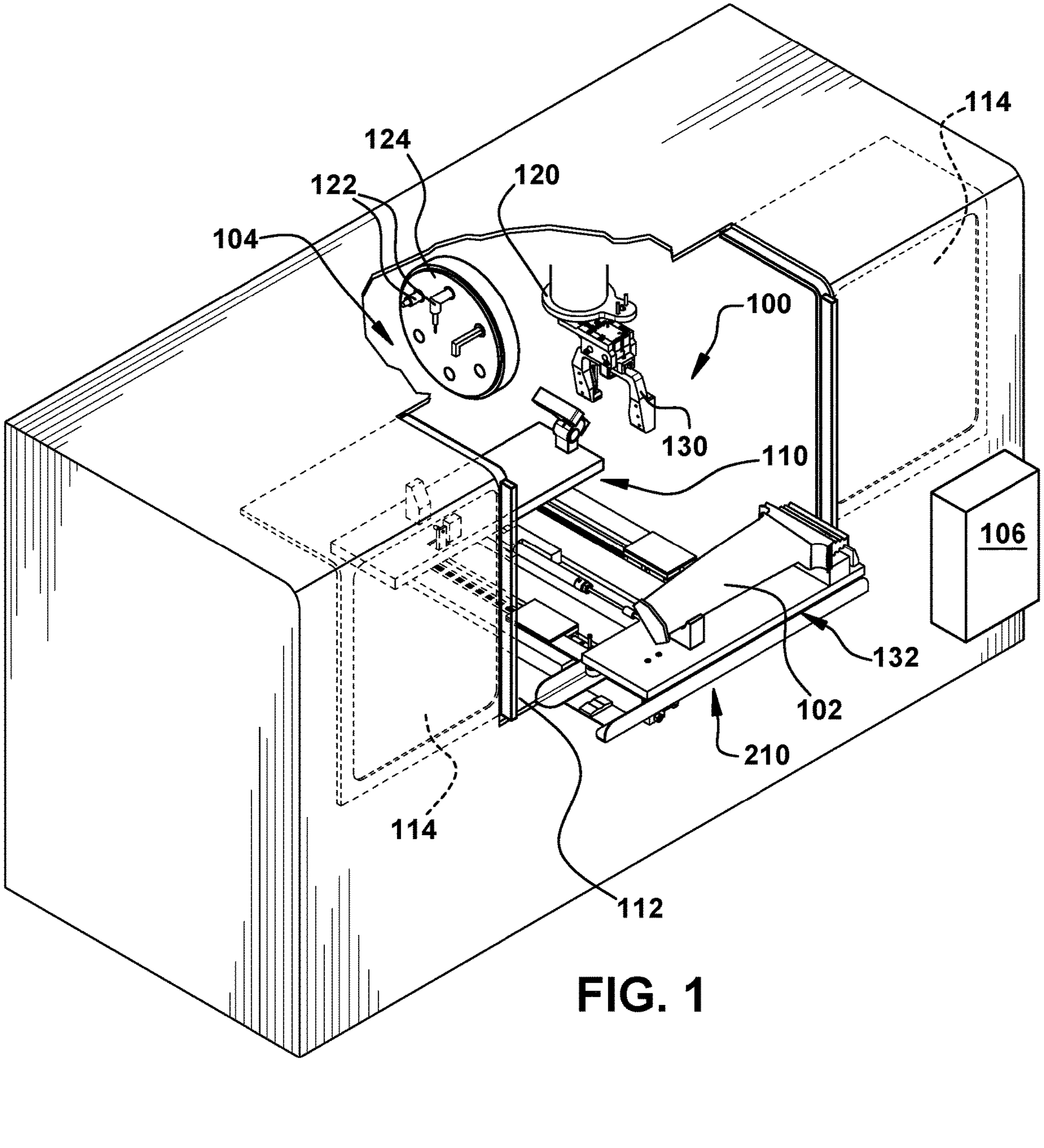
FIG. 1 shows a perspective view of a handling system on a computer numerical control machining system, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like members between the drawings.

DETAILED DESCRIPTION

As an initial matter, in order to clearly describe the current disclosure, it will become necessary to select certain terminology when referring to and describing relevant machine components within the illustrative application of a computerized machining system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. "Distal" and "proximate" relative to a stated element are relative terms in that "distal" refers to a location distanced from the stated element compared to the proximate location, and "proximate" refers to a location closer to the stated element than the distal location. In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," an, and "the" are intended to include the plural forms as well, unless the context clearly indicates otherwise. It will be further understood that the terms "comprises" and/or "comprising," when used in this specification, specify the presence of stated features, integers, steps, operations, members, and/or components, but do not preclude the presence or addition of one or more other features, integers, steps, operations, members, components, and/or groups thereof.

"Optional" or "optionally" means that the subsequently described event may or may not occur or that the subsequently described feature may or may not be present and that the description includes instances where the event occurs or the feature is present and instances where the event does not occur or the feature is not present.

Where a member or layer is referred to as being "on," "engaged to," "connected to," "coupled to," or "mounted to" another member or layer, it may be directly on, engaged, connected, coupled, or mounted to the other member or layer, or intervening members or layers may be present. In contrast, when a member is referred to as being "directly on," "directly engaged to," "directly connected to," or "directly coupled to" another member or layer, there are no intervening members or layers present. Other words used to describe the relationship between members should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a handling system for a turbine component relative to a computer numerical control (CNC) machining system. A gripper of the handling system includes a mounting arm configured to be operatively coupled to a tool handler of the machining system, a plurality of contact members configured to collectively grasp the turbine component, and a first actuator configured to move at least one of the contact members between a release position in which the contact members receive a part of the turbine component therebetween at a first longitudinal position thereof and a grasp position in which the contact members grasp the part at a second longitudinal position thereof different than the first longitudinal position. The tool handler and/or the turbine component travels linearly to move the gripper relative to the turbine component between the first longitudinal position and the second longitudinal position. The handling system may also include a loading system allowing easier loading/unloading of the turbine component. The handling system allows easier loading and unloading of heavy or complex shaped turbine components, like turbine blades or nozzles with airfoils, without extensive bending over and/or extending while holding the turbine component. The handling system is advantageous on machining systems with a machine enclosure but can also be helpful on machining systems without a machine enclosure.

FIG. 1 shows a perspective view of a handling system 100 for a turbine component 102 relative to a computer numerical control machining system 104. As will be described herein, handling system 100 may include a gripper 130 and a loading system 132. Computer numerical control machining system 104 may include any now known or later developed computer numerical control-based machining system 104 (hereafter "machining system" or "computerized machining system" for brevity). In one non-limiting example, machining system 104 may include but is not limited to a HAAS model that includes a vertical spindle coupler such as the VF series, Universal Machine series, VR series, and TR series, available from HAAS Automation Inc., Oxnard, CA. Machining system 104 automatically handles or machines metal or other rigid material components using a computer 106. Machining system 104 processes turbine component 102 to meet specifications by following a set of program instructions and without an operator manually controlling the machining operation. Machining system 104 includes a component fixture 110 that holds and moves turbine component 102 as the machining occurs. In certain embodiments, although not necessary in all cases, component fixture 110 may be positioned within a machine enclosure 112 in which turbine component 102 is machined. Machine enclosure 112 may include any now known or later developed enclosure to protect users from the machining, e.g., airborne debris, broken parts, etc. Machine enclosure 112 may include a set of doors 114 that can open and close to allow or deny access to component fixture 110. Note, doors 114 are shown retracted to an open position in FIG. 1. In many cases, doors 114 are automated to open and close under control of computer 106.

Machining system 104 also includes a tool handler 120 that can select from a number of tools 122, e.g., on a tool carrier 124, for operating on or relative to turbine component 102. For example, tool handler 120 may select a tool from tool carrier 124 through an opening in a ceiling of machine enclosure 112. Tool carrier 124 may move, e.g., rotate, under control of computer 106 to place a desired tool 122 within the grasp of tool handler 120. Computer 106 controls the operation and positioning of tools 122 and turbine component 102 via component fixture 110 and/or tool handler 120 during automated machining of turbine component 102. Tools 122 may take any now known or later developed form, such as but not limited to: tools for physically changing the component such as milling, drilling, tapping, boring, abrading, etc.; tools for confirming position of the component and/or accuracy of the machining such as physical or optical probes; and tools for post-machining processing like cleaning machining debris, removing contaminants and/or drying the component such as air jets or high-speed fans. Machining system 104 may also include any now known or later developed coolant delivery system (not shown in FIG. 1) where machining requires cooling machining tool 122 and/or turbine component 102. As the details of machining system 104 are otherwise well known in the art, no further description is necessary.

Figure 2:
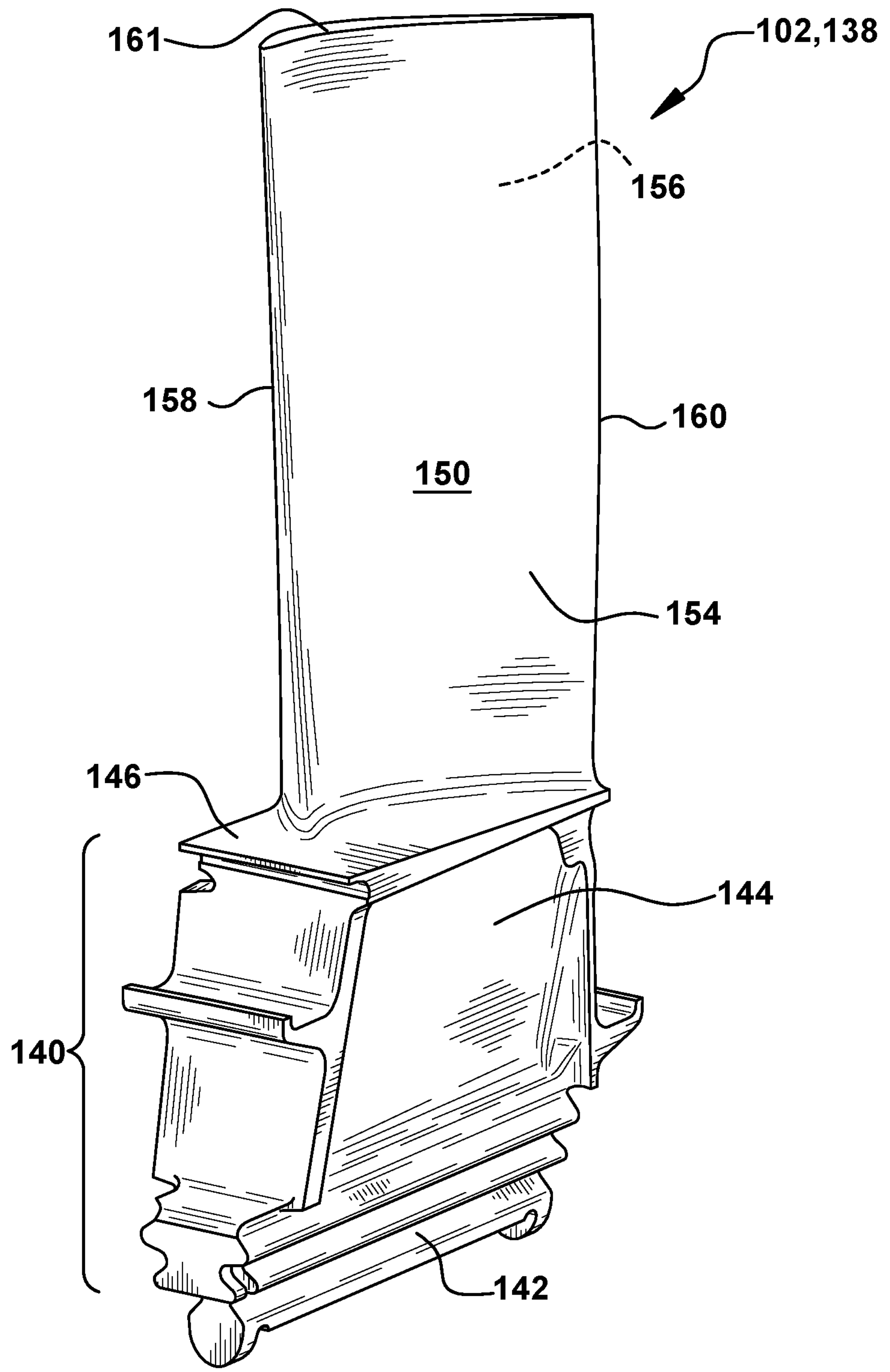
FIG. 2 shows a perspective view of an illustrative turbine component in the form of a turbine blade that can be handled by a handling system, according to embodiments of the disclosure.
Figure 3:
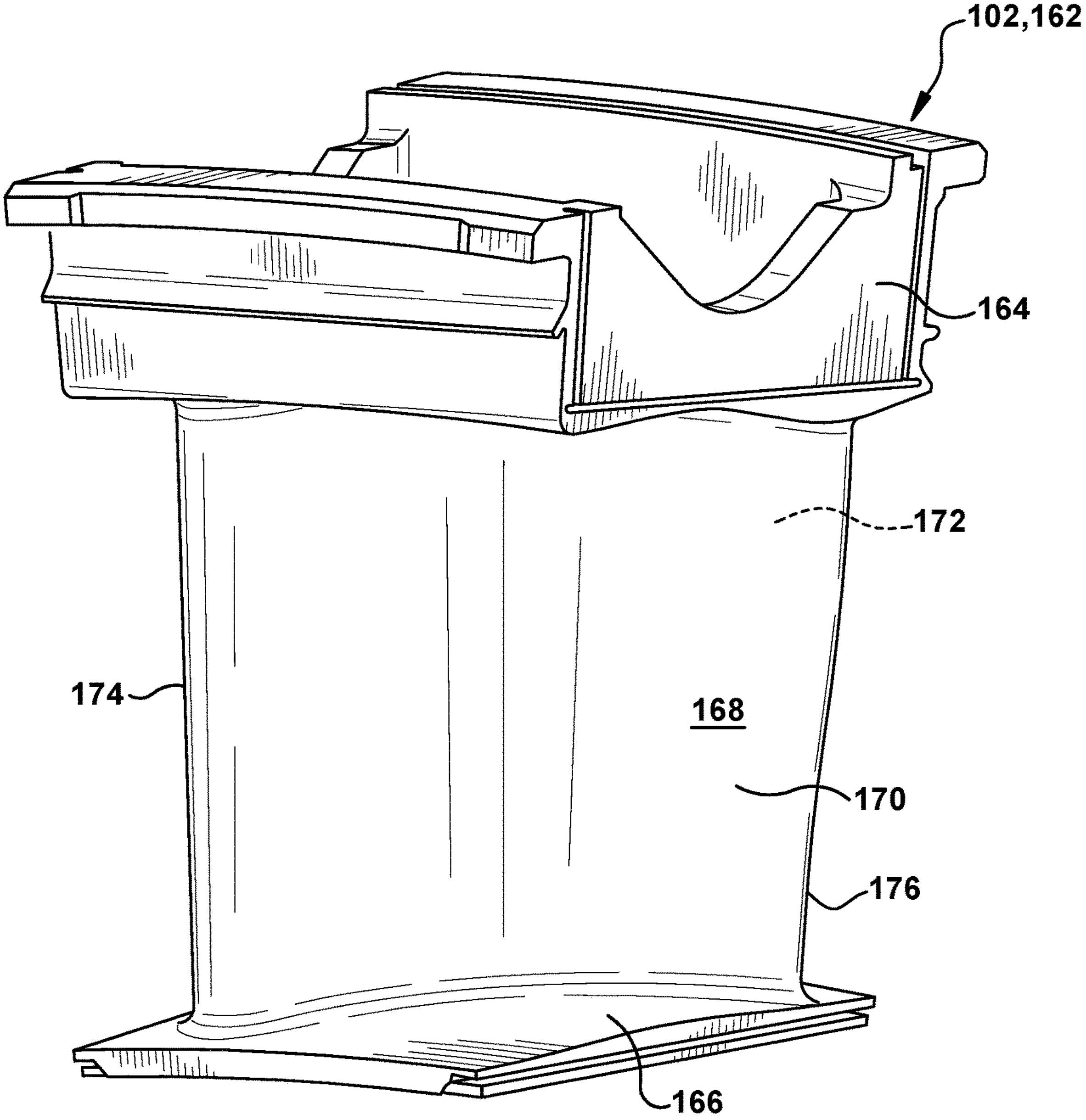
FIG. 3 shows a perspective view of an illustrative turbine component in the form of a turbine nozzle that can be handled by a handling system, according to embodiments of the disclosure.

For purposes of description, turbine component 102 is illustrated as a turbine blade or nozzle. FIGS. 2 and 3 show illustrative turbine components 102 of the type machined by machining system 104. FIG. 2 shows a perspective view of a turbine rotor blade 138. Turbine rotor blade 138 includes a root 140 by which rotor blade 138 attaches to a rotor of a turbine (not shown). Root 140 may include a dovetail 142 configured for mounting in a corresponding dovetail slot in the perimeter of a rotor wheel of a rotor. Root 140 may further include a shank 144 that extends between dovetail 142 and a blade platform 146, which is disposed at the junction of airfoil 150 and root 140 and defines a portion of the inboard boundary of the flow path through a turbine assembly of a turbine. Airfoil 150 of rotor blade 138 includes a concave pressure side (PS) outer wall 154 and a circumferentially or laterally opposite convex suction side (SS) outer wall 156 extending axially between opposite leading and trailing edges 158, 160 respectively. Walls 154 and 156 also extend in the radial direction from platform 146 to an outboard tip 161. As known in the art, an optional tip shroud (not shown) may be coupled at outboard tip 161.

FIG. 3 shows a perspective view of a stationary turbine vane or nozzle 162 (hereafter "nozzle 162" for brevity). Nozzle 162 includes an outer platform 164 by which nozzle 162 attaches to a stationary casing (not shown) of a turbine. Outer platform 164 may include any now known or later developed mounting configuration for mounting in a corresponding mount in the casing. Nozzle 162 may further include an inner platform 166 for positioning between adjacent turbine rotor blades 138 (FIG. 2), i.e., their platforms 146 (FIG. 2), in a turbine. Airfoil 168 of nozzle 162 includes a concave pressure side (PS) outer wall 170 and a circumferentially or laterally opposite convex suction side (SS) outer wall 172 extending axially between opposite leading and trailing edges 174, 176, respectively. Walls 170 and 172 also extend in the radial direction from platform 166 to platform 164. Embodiments of the disclosure described herein may be applied to either turbine rotor blade 138, nozzle 162 or another turbine component. For purposes of description, only a turbine blade 138 is illustrated in subsequent drawings. It is understood that other features of turbine components 102 are not shown, such as but not limited to internal cooling structures, cutout shapes, outer wall angling/shapes, etc. In any event, it will be understood that turbine component 102 has a complex shape that may include many turns and shapes that are difficult to manually grasp. In addition, turbine component 102 may have sufficiently high weight that users of machining system 104 want to avoid bending and/or extending their arms to place turbine component 102 onto component fixture 110.

With reference to FIG. 1 and FIGS. 4-6, handling system 100 includes a gripper 130 and may include a loading system 132. Gripper 130 functions to move component 102 from loading system 132 to and from component fixture 110 of machining system 104 in a safe and automated fashion. Gripper 130 includes a mounting arm 180 configured to be operatively coupled to tool handler 120 of machining system 104. Mounting arm 180 may include any structural element configured to function as a base of gripper 130 upon which other parts of gripper 130 are coupled. Mounting arm 180 may have any configuration necessary to position the other parts of gripper 130. Mounting arm 180 can be selectively coupled and moved to tool handler 120 in any now known or later developed fashion. In most cases, a tool handler 120 of a particular machining system 104 includes a standard coupler 182 for all tools 122 (FIG. 1) used therein. For the illustrative machining system 104 described herein, coupler 182 includes a spindle 183 that can be coupled to any tool 122 used in machining system 104. In the example shown, spindle 183 may have a frustoconical surface configured to mate in a similarly shaped opening in tool handler 120. The frustoconical (or tapered) spindle 183 is standard for, among others, many HAAS Automation models (e.g., CAT30, CAT40, CAT50). Other similar spindle versions are also possible, such as those for machining systems available from HSK Machineworks. Tool handler 120 can selectively grasp an end of spindle 183 so tool handler can move tool 122, or gripper 130, and can rotate spindle 183 to rotate the position of tool 122 or gripper 130. Hence, with coupler 182 on mounting arm 180 of gripper 130, tool handler 120 can handle gripper 130 just as any other tool 122 of machining system 104. More particularly, as understood in the art, tool handler 120 can select tools 122 from tool carrier 124 through an opening (not shown) in a ceiling of machine enclosure 112. Tool carrier 124 may move in any fashion under control of computer 106 to position the desired tool 122 or gripper 130 for selection by tool handler 120, e.g., tool carrier 124 may include a rotatable carriage having various location for storing tools 122 and gripper 130. Using coupler 182, gripper 130 can be stored, selected, handled and/or operated by tool carrier 124 and tool handler 120 just as any other tool 122 of machining system 104.

Tool handler 120 and, in particular, coupler 182 (frustoconical spindle 183 thereof) may also include any now known or later developed mechanism(s) to provide power to tools 122 or gripper 130. With regards to gripper 130, coupler 182 includes a passage 185 therethrough for delivery of an operative fluid to operate an actuator 187 of gripper 130, as will be described herein.

It is emphasized that coupler 182 can take a variety of alternative forms depending on machining system 104, tool handler 120 and/or tool carrier 124 used. Other forms of coupler 182 are considered within the scope of the disclosure.

Figure 4:
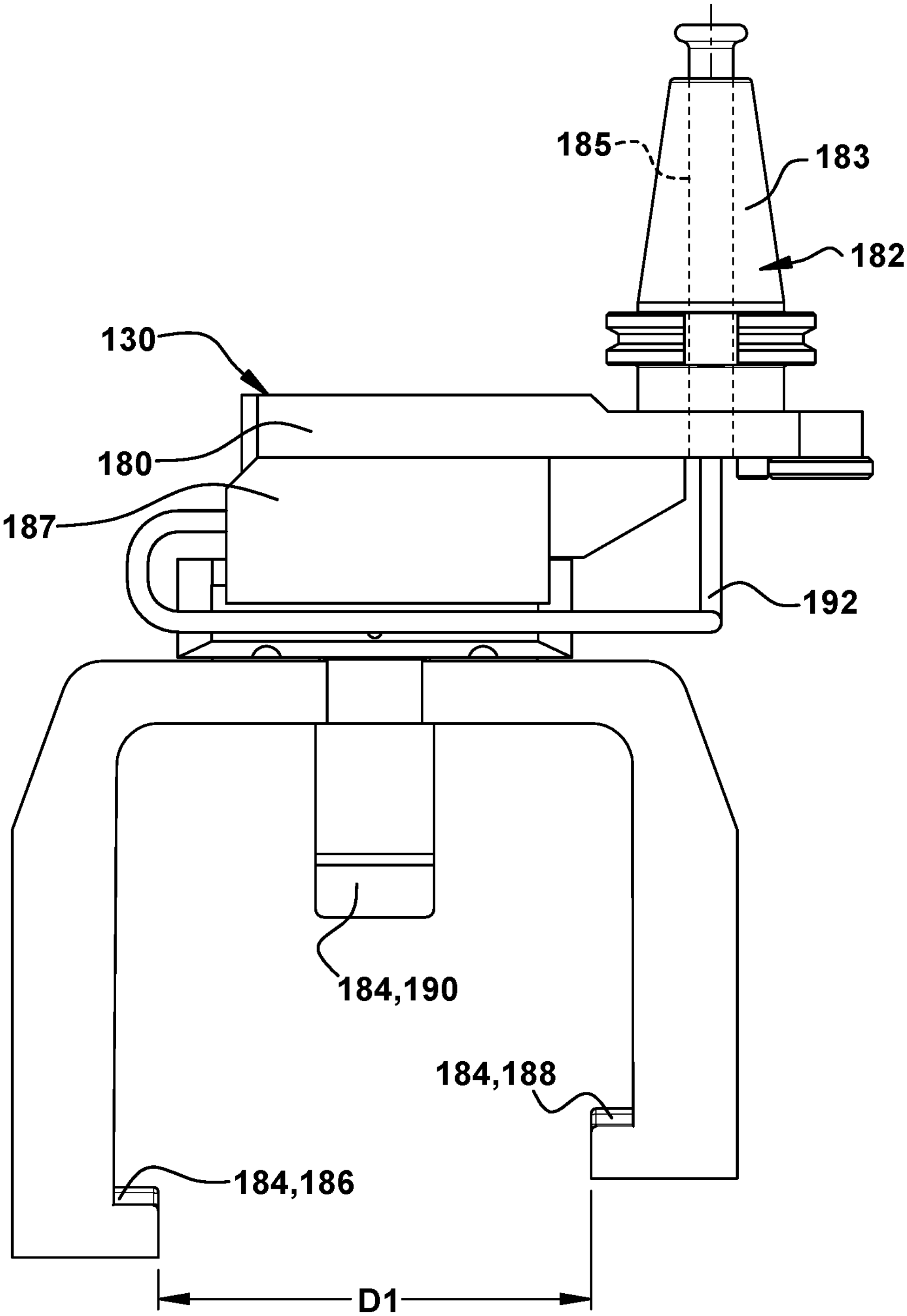
FIG. 4 shows a side view of a gripper of a handling system apart from a tool handler of the machining system, according to embodiments of the disclosure.
Figure 5:
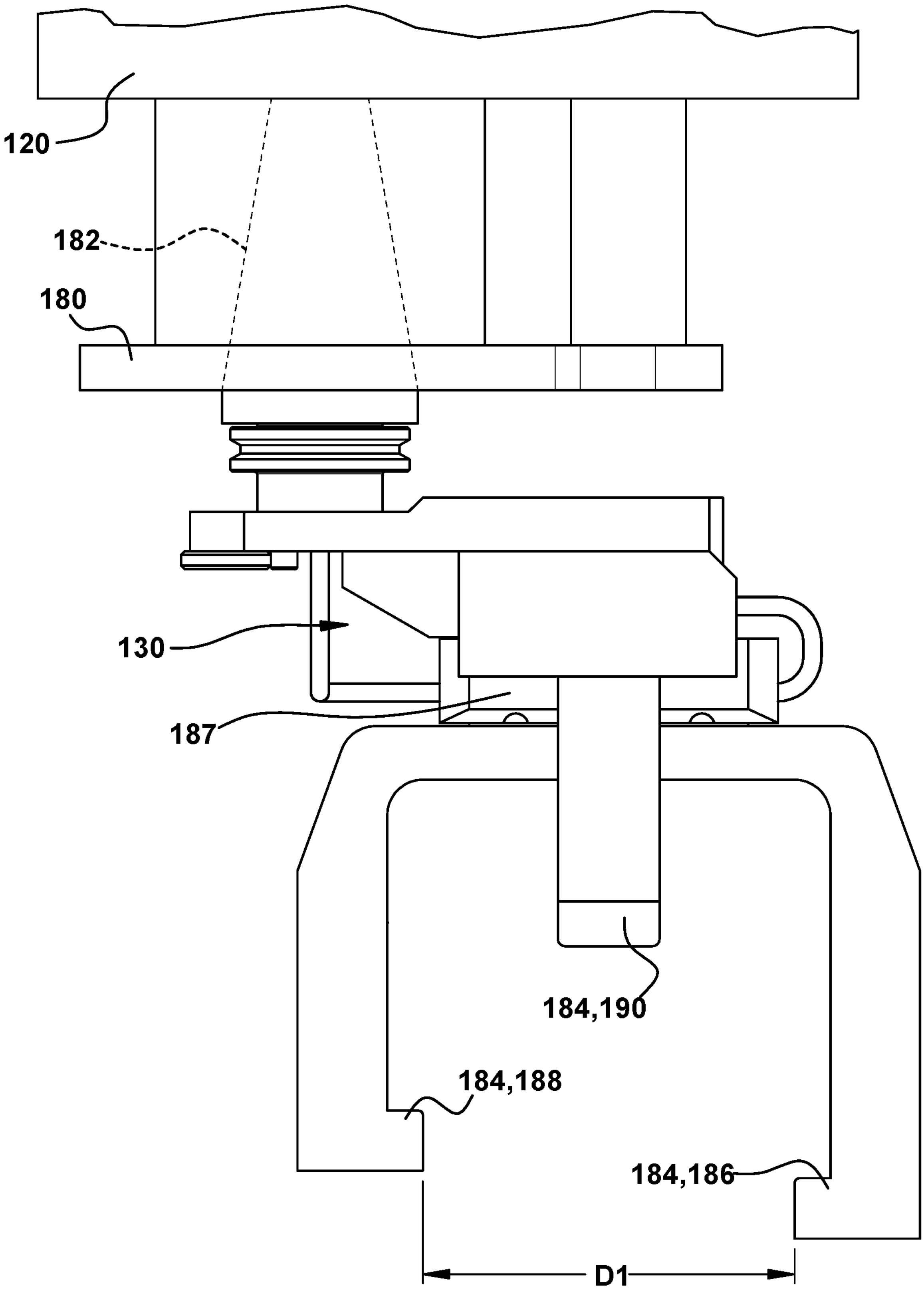
FIG. 5 shows a side view of a gripper of a handling system on a tooler handler of the machining system, according to embodiments of the disclosure.
Figure 6:
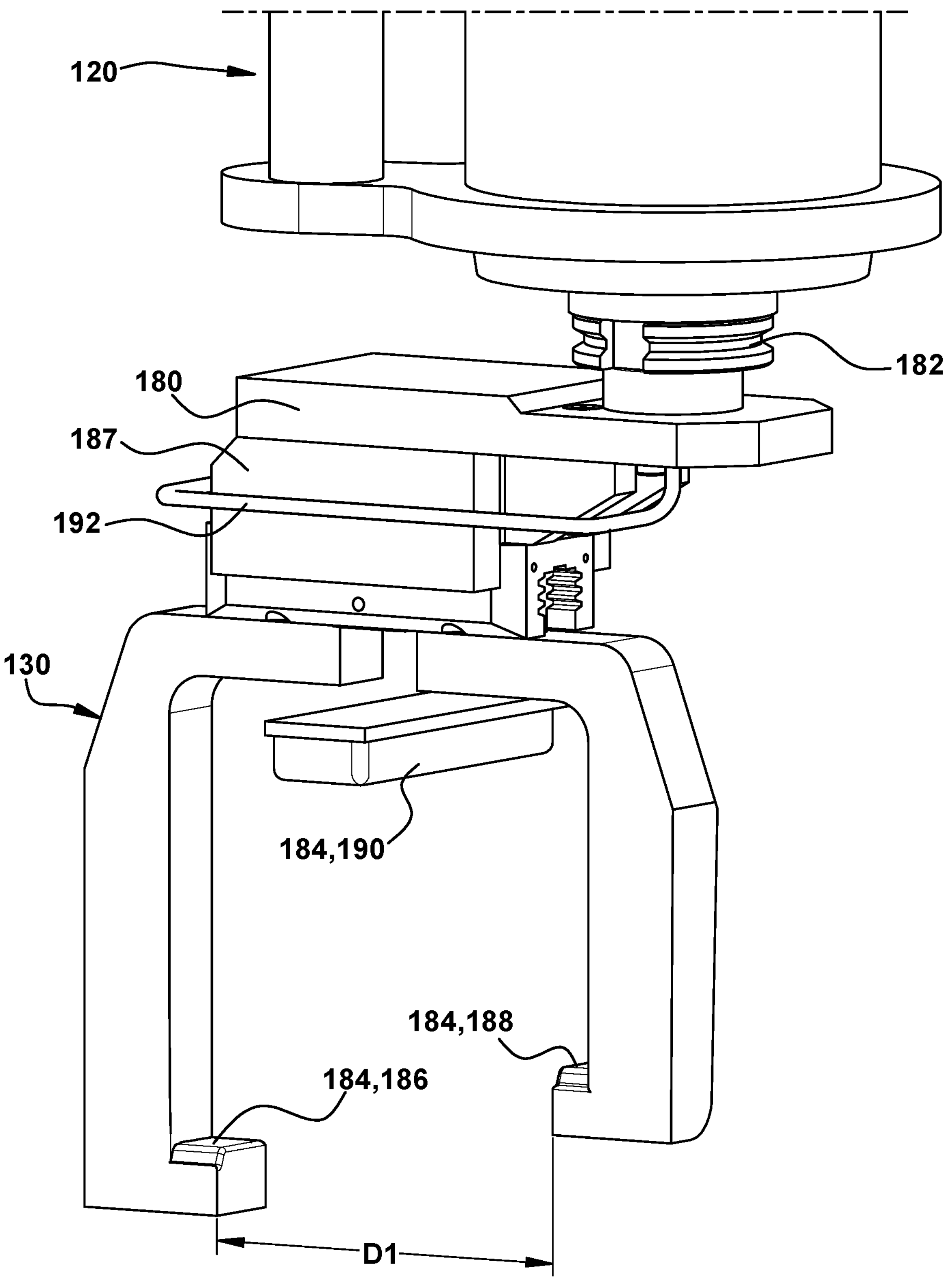
FIG. 6 shows a perspective view of a gripper of a handling system on a tooler handler of the machining system, according to embodiments of the disclosure.

Gripper 130 may also include a plurality of contact members 184 configured to selectively and collectively grasp turbine component 102. Contact members 184 may include any number of members for securely grasping part of turbine component 102. The number of contact members 184 required may differ based on turbine component 102 shape, size, weight, etc. In the example shown herein, contact members 184 are configured to grasp an airfoil 150, 168 of turbine component 102; however, other parts of turbine component 102 can also be grasped by gripper 130. With regard to grasping an airfoil 150, 168, contact members 184 may include a first fixed contact member 186 and a second fixed contact member 188. As shown in FIGS. 4-6, first and second fixed contact members 186, 188 are distanced apart, i.e., distance D1, to allow passage of part (e.g., airfoil 150, 168) of turbine component 102 therebetween at a first longitudinal position L1 of the part and prevent passage of the part of turbine component 102 therebetween at a second longitudinal position L2 of the part. Fixed contact members 186, 188 may also have different lengths (see e.g., FIG. 8) to accommodate, for example, the curvature of airfoil 150, 168 of turbine component 102. As will be further described, contact members 184 may also include a moveable contact member 190 that grasps turbine component 102 against fixed contact members 186, 188.

Figure 7:
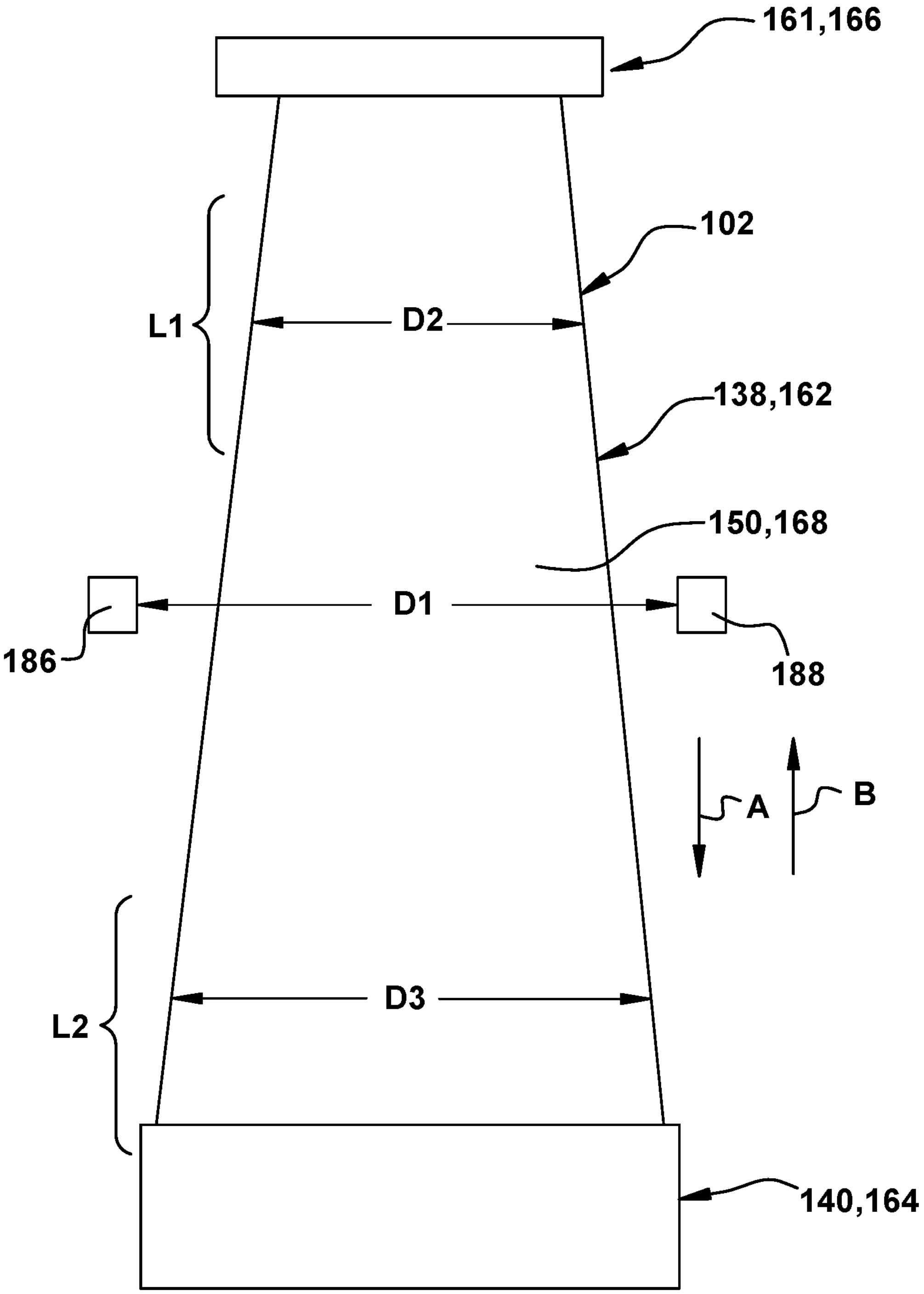
FIG. 7 shows a schematic view of a turbine component, according to embodiments of the disclosure.

With further regard to fixed contact members 186, 188, FIG. 7 shows a schematic rendering of a turbine blade or nozzle 138, 162 showing an airfoil 150, 168 thereof having different cross-sectional widths D2, D3 at different longitudinal positions L1, L2 thereof. As shown, at a first longitudinal position L1, airfoil 150, 168 may have a first width D2 that is smaller than a second width D3 at a second longitudinal position L2. Longitudinal position L1 is different than longitudinal position L1, i.e., it is at a different longitudinal location along airfoil 150, 168. Longitudinal positions L1, L2 are shown with brackets to illustrate that they may not be just a single location but a range of locations along a longitudinal extent of airfoil 150, 168. The possible ranges of longitudinal positions do not overlap. In any event, distance D1 (of fixed contact members 186, 188 shown schematically in FIG. 7) is larger than width D2 but smaller than width D3 of airfoil 150, 168 of turbine component 102. In this manner, fixed contact members 186, 188 of gripper 130 can be moved vertically to surround opposing surfaces of airfoil 150, 168 at first longitudinal position L1, i.e., for a release position of gripper 130. Gripper 130 can then be moved longitudinally relative to turbine component 102 and airfoil 150, 168 thereof such that fixed contact members 186, 188 of gripper 130 surround opposing surfaces of airfoil 150, 168 at second longitudinal position L2, i.e., for a grasp position of gripper 130 (FIGS. 15-18). More particularly, per arrow A in FIG. 7, gripper 130 may be moved longitudinally from first longitudinal position L1 to second longitudinal position L2. Since distance D1 between fixed contact members 186, 188 is smaller than width D3 of airfoil 150, 168 at second longitudinal position L2, turbine component 102 cannot move outside of fixed contact members 186, 188. In a similar fashion, per arrow B in FIG. 7, gripper 130 may be moved longitudinally from second longitudinal position L2 to first longitudinal position L1, i.e., for a release position of gripper 130 (FIGS. 14-19). Since distance D1 between fixed contact members 186, 188 is larger than width D2 of airfoil 150, 168 at first longitudinal position L1, fixed contact members 186, 188 can move past and from turbine component 102 after movement from second longitudinal position L2 to first longitudinal position L1. As will be further described, at least one of tool handler 120 and turbine component 102 (via component fixture 110 (FIG. 1) can move linearly to move gripper 130 relative to turbine component 102 between first longitudinal position L1 and second longitudinal position L2. As will be described, the grasp position can be used for moving turbine component 102 from loading platform 210 to component fixture 110 prior to machining, or from component fixture 110 to loading platform 210 after machining.

Gripper 130 also includes actuator 187 configured to operate gripper 130. More particularly, as noted, contact members 184 may include moveable contact member 190, which is operatively coupled to actuator 187. Moveable contact member 190 is selectively movable to cause grasping of turbine component 102 by plurality of contact members 184 in a selected longitudinal position of turbine component 102, i.e., second longitudinal position L2. More particularly, actuator 187 selectively moves at least one of contact members 184, i.e., moveable contact member 190, between a release position (FIGS. 14 and 19) in which contact members 184 receive or release a part, e.g., airfoil 150, 168, of turbine component 102 therebetween at first longitudinal position L1 of the part of turbine component 102 and a grasp position in which contact members 184 grasp the part of turbine component 102 at a second longitudinal position L2 of the part different than first longitudinal position L1. In the example shown, moveable contact member 190 moves linearly to force airfoil 150, 168 at or near second longitudinal position L2 against fixed contact members 186, 188 to grasp the turbine component. More particularly, moveable contact member 190 contacts turbine component 102 at or near second longitudinal position L2 and pushes fixed contact members 186, 188 against opposing surfaces of turbine component 102, thus securely grasping turbine component 102. In certain embodiments, although not necessary, second longitudinal position L2 may include a center of gravity of turbine component 102 to assist in balanced carrying of turbine component 102.

Actuator 187 can include any now known or later developed actuator configured to move moveable contact member 190 to grasp turbine component 102 with fixed contact members 186, 188. In one non-limiting example, actuator 187 includes a pneumatic actuator that receives a controlled air flow under control of computer 106 (FIG. 1) through passage 185 (FIG. 4) in coupler 182 (FIG. 4). FIGS. 4 and 6 show a conduit 192 for delivery of air from coupler 182 to actuator 187. Other delivery mechanisms may also be possible such as but not limited to fluid passages (not shown) in mounting arm 180 to deliver air from coupler 182 to actuator 187.

Figure 8:
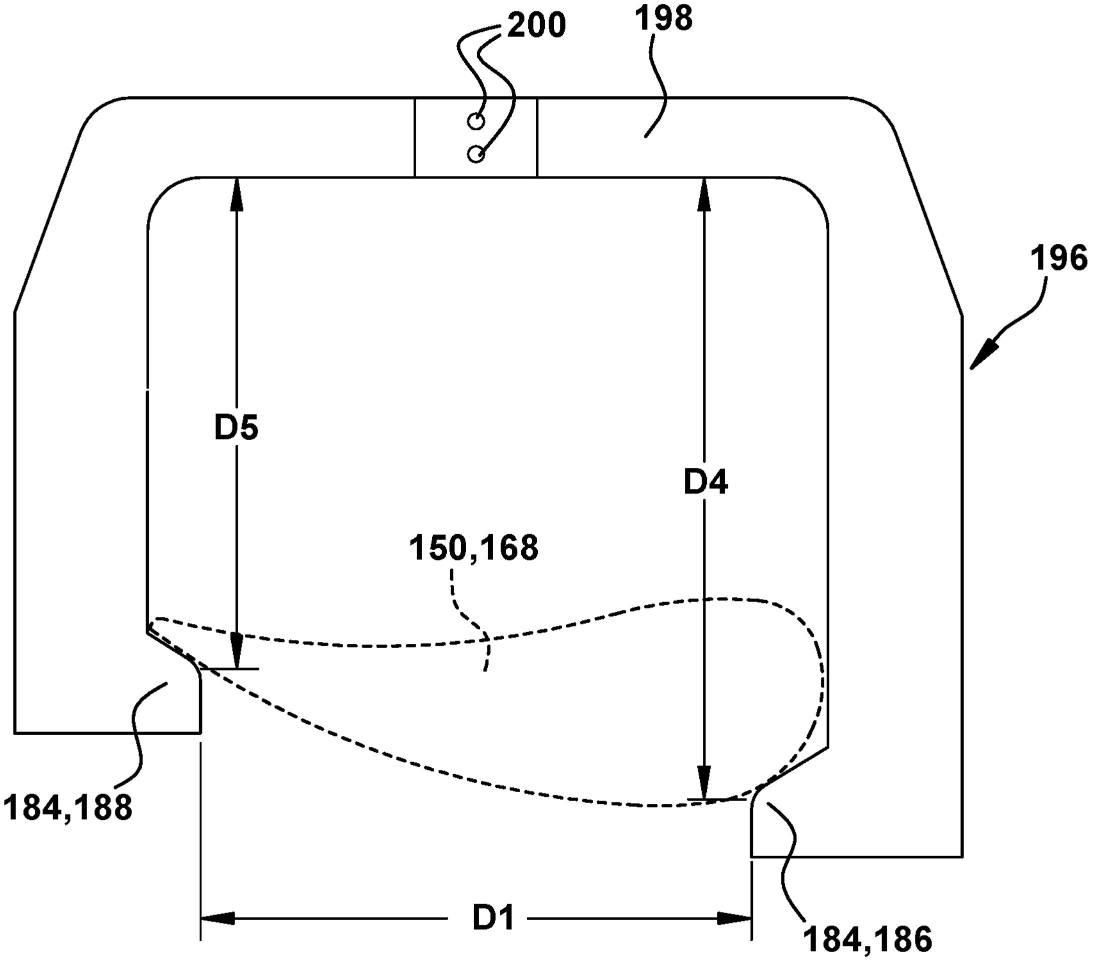
FIG. 8 shows a side view of fixed contact members of a gripper of a handling system, according to embodiments of the disclosure.

Gripper 130 can include parts thereof sized to handle different sized and/or shaped turbine components 102. For example, as shown in FIG. 8, fixed contact members 186, 188 may be formed in an integral manner, e.g., as a C-shaped member 196 with a base 198. As noted, fixed contact members 186, 188 may have different lengths to accommodate, for example, the curvature of airfoil 150, 168 of turbine component 102. For example, fixed contact member 186 may have a length D4 and fixed contact member 188 may have a length D5 that are different. Different contact member 184 arrangements can be created to handle different sized and/or shaped turbine components 102. For example, a set of C-shaped members 196 with contact members with different spacing D1 and lengths D4, D5 can be created for different turbine components 102 or different sized turbine components 102, e.g., different sized first stage turbine blades of differently sized turbines. In certain embodiments, the different C-shaped members 196 can be mounted to a mounting arm 180 and actuator 187 arrangement that is universal to the different C-shaped members 196, e.g., through fastener (s) in opening(s) 200 in C-shaped members 196. Other manners of arranging length and spacing of contact members 184 other than C-shaped member 196 may also be possible. Different lengths of moveable contact member 190 can also be created for different sized turbine components 102 or, where possible, a single universally sized moveable contact member 190 can be used.

Contact members 184 can also have surfaces thereof sized and/or shaped in any fashion to provide secure engagement thereof with whatever surface of turbine component 102 they contact. Contact members 184 can be, for example, partly or entirely curved or planar, have rough or smoothed surfaces and/or have different cross-sectional shapes. Contact members 184 can also have material selected to accommodate the material of turbine component 102, e.g., to ensure secure grasping without damage to turbine component 102.

In view of the foregoing, certain embodiments include gripper 130 for handling system 100 for turbine component 102 including airfoil 150, 168 (FIGS. 2, 3 and 7). Gripper 130 includes mounting arm 180 configured to be operatively coupled to tool handler 120 of computerized machining system 104. Gripper 130 also includes first contact member 186 fixed relative to mounting arm 180 and second contact member 188 fixed relative to mounting arm 180. As shown in FIG. 7, first and second fixed contact members 186, 188 are distanced apart (distance D1) to allow passage of airfoil 150, 168 (FIGS. 2, 3 and 7) therebetween at a first longitudinal position L1 of airfoil 150, 168 having first width D2 and prevent passage of airfoil 150, 168 therebetween at a second longitudinal position L2 of airfoil 150, 168 having second, wider width D3 than first width D2. Gripper 130 also includes third, moveable contact member 190 movable between a grasp position (FIGS. 15-17) contacting a portion of turbine component 102 and seating turbine component 102 against first and second contact members 186, 188 and a release position (FIGS. 14 and 19) out of contact with turbine component 102 and allowing movement of turbine component 102 relative to first and second contact members 186, 188. Gripper 130 also includes actuator 187 moving third contact member 190 between the grasp position and the release position, e.g., using controlled fluid flow to extend or retract moveable contact member 190 under control of computer 106.

Handling system 100 may also include a loading system 132. Loading system 132 is shown, for example, in FIGS. 1 and 9-12. Loading system 132 includes a loading platform 210. Loading platform 210 may include any structure for having turbine component 102 rested thereon in a predefined location. For example, loading platform 210 may include a plate 216 having one or more component holders 218 thereon sized and/or shaped to hold turbine component 102 in a predefined location, e.g., for grasping by gripper 130.

Figure 10:
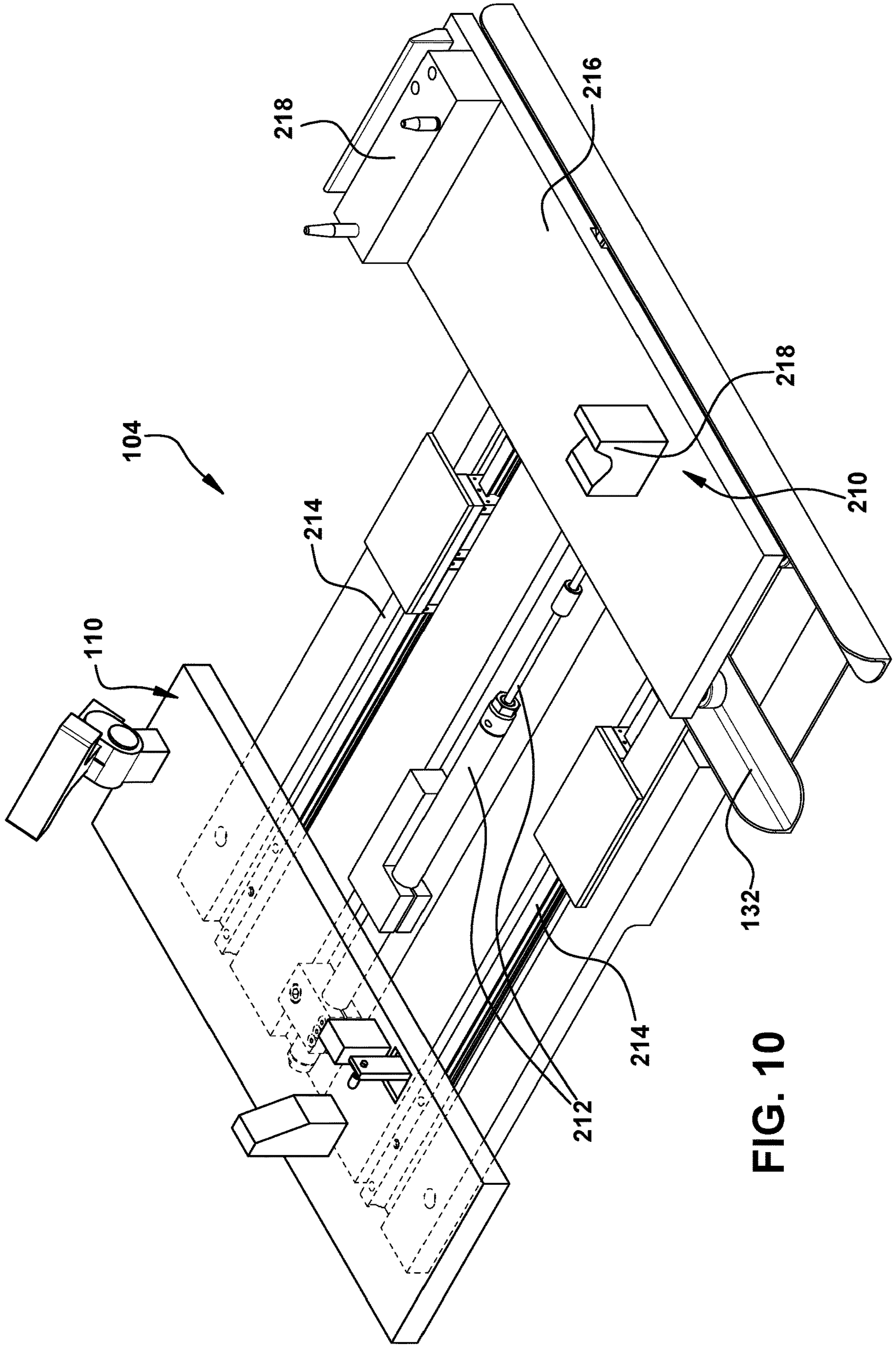
FIG. 10 shows a downward perspective view of the loading platform of the handling system in the user-access position, according to embodiments of the disclosure.
Figure 11:
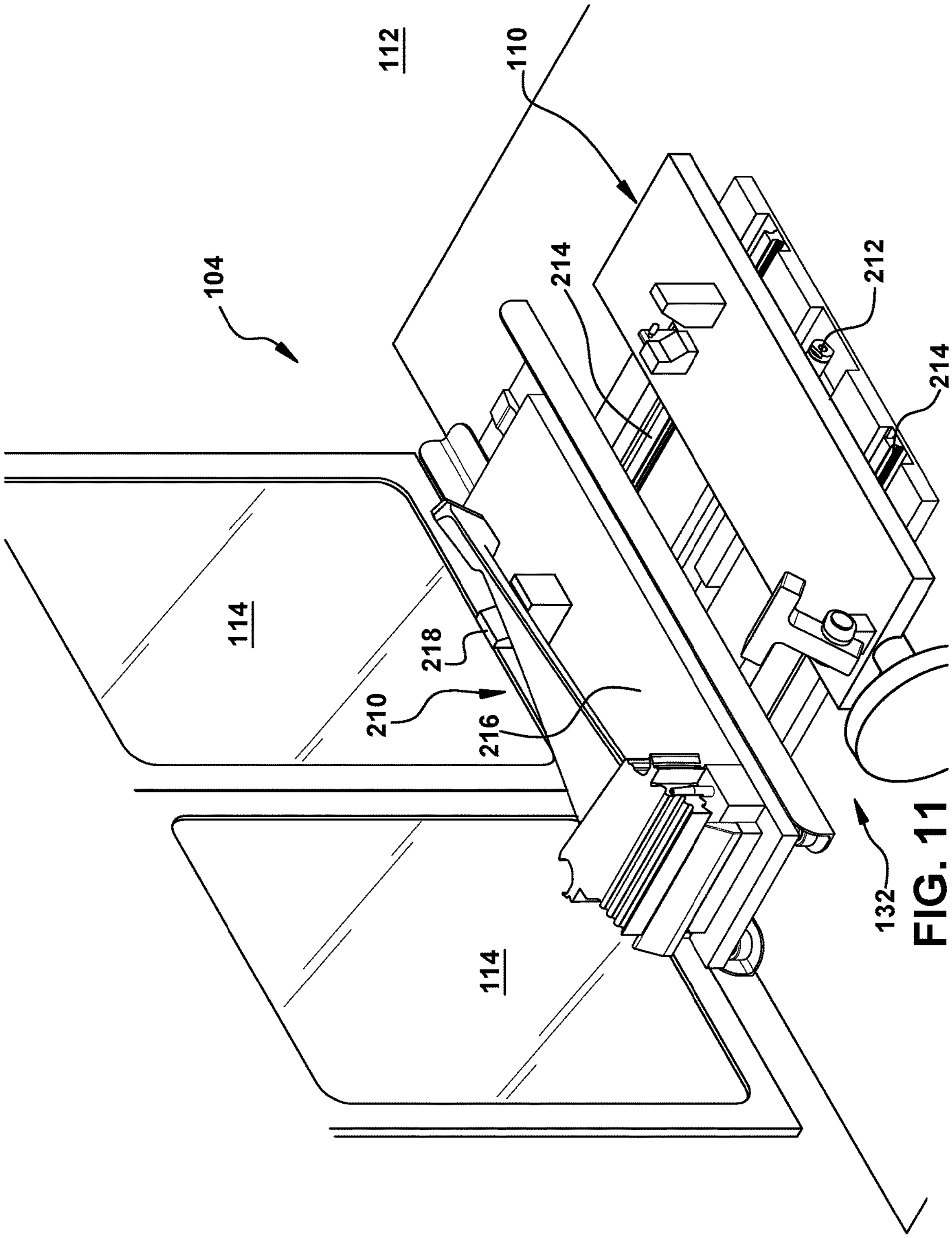
FIG. 11 shows a perspective view of a handling system (from within a machine enclosure of the machining system) in a loading position of a loading platform, according to embodiments of the disclosure.

In certain embodiments loading system 132 may include only a loading platform 210 in a loading position, as shown in FIG. 11. In this setting, with loading platform 210 only in the loading position proximate component fixture 110, turbine component 102 is free to be manually moved by a user, i.e., a human user (not shown), with less bending or extending their arms necessary to position turbine component 102 on component fixture 110. In other embodiments, loading system 132 may include a (moveable) loading platform 210 and an actuator 212 configured to move loading platform 210 between a user-access position (FIGS. 1, 9, 10, 12) distal from component fixture 110 of machining system 104 and a loading position (e.g., FIG. 11) proximate component fixture 110 of machining system 104. In this setting, with loading platform 210 in the user-access position distal component fixture 110, turbine component 102 is free to be manually moved by a user, i.e., a human user (not shown), with little to no bending or extending their arms into machine enclosure 112, to position turbine component 102. In certain embodiments, where necessary, loading system 132 may also include one or more linear guide tracks 214 mounting loading platform 210 for lateral movement relative to component fixture 110.

Figure 9:
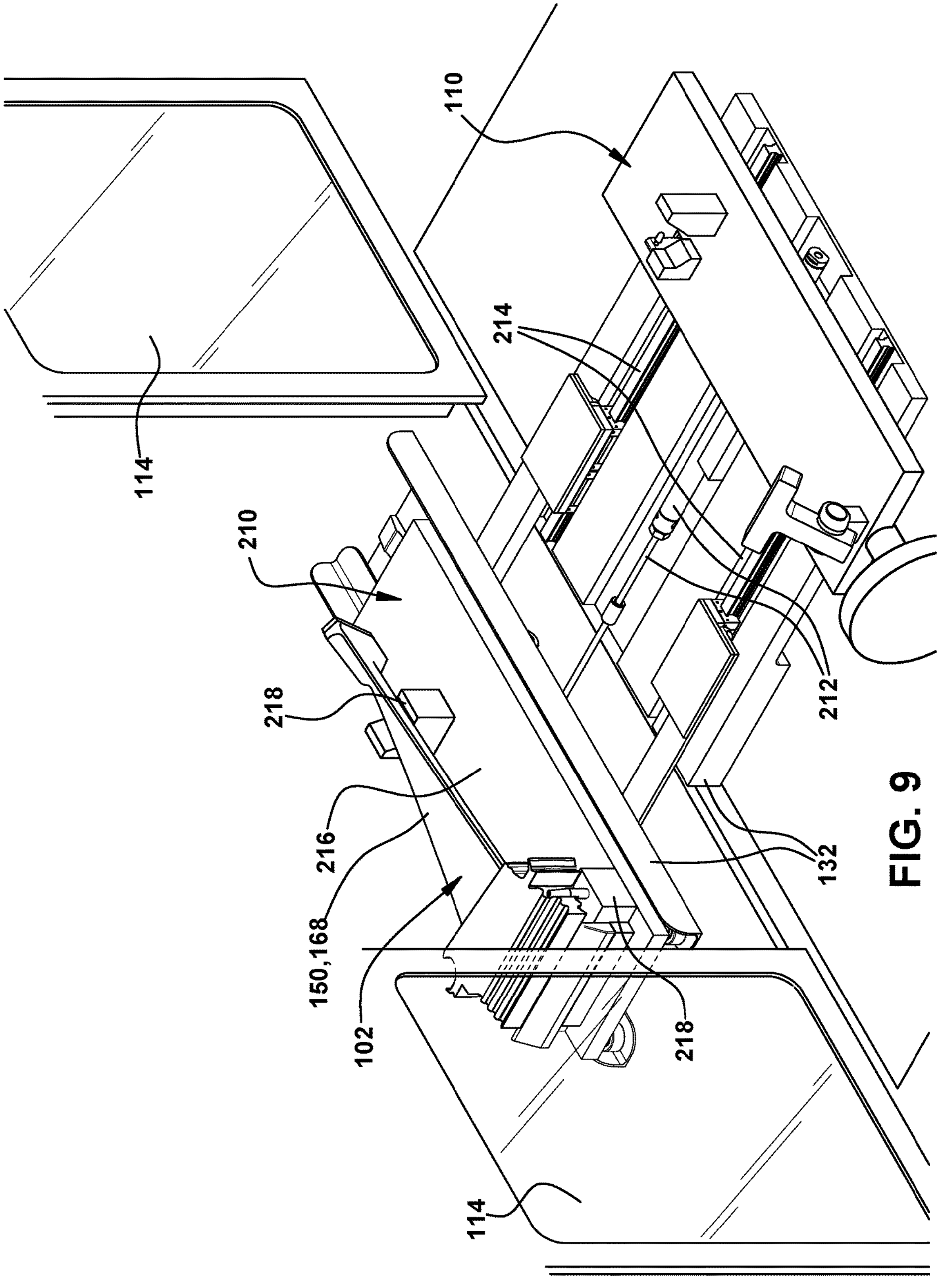
FIG. 9 shows a perspective view of a handling system (from within a machine enclosure of the machining system) in a user-access position of a loading platform, according to embodiments of the disclosure.
Figure 12:
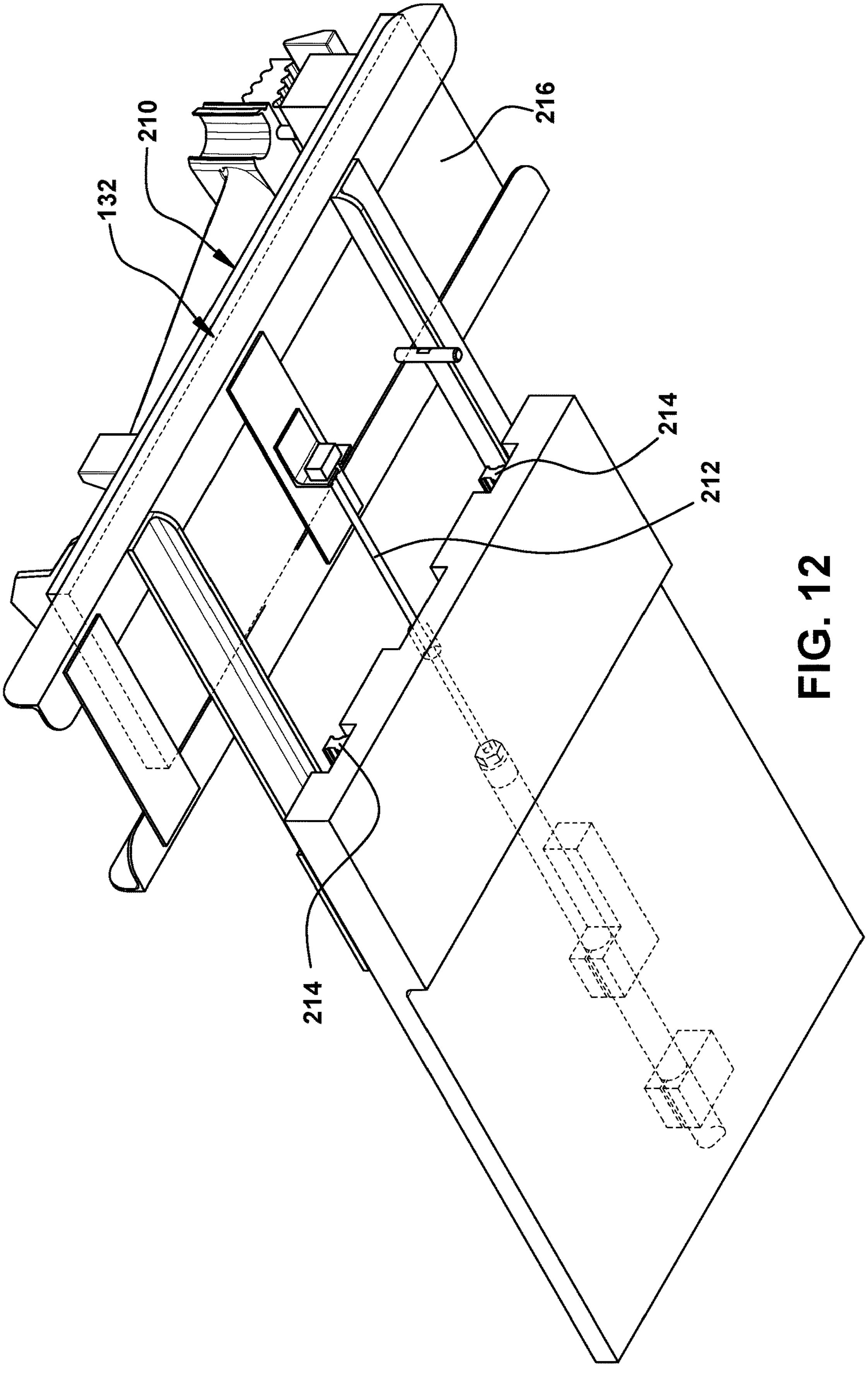
FIG. 12 shows an upward perspective view of the loading platform of the handling system in the user-access position of the loading platform, according to embodiments of the disclosure.

To illustrate operation of the latter embodiment, FIG. 9 shows a perspective view of loading system 132 in a user-access position (also shown in FIG. 1) from within machine enclosure 112, FIG. 10 shows a perspective view of loading system 132 from above in the user-access position from outside of machine enclosure 112, FIG. 11 shows a perspective view of loading system 132 in a loading position from within machine enclosure 112, and FIG. 12 shows a perspective view of loading system 132 from underneath in the user-access position from outside of machine enclosure 112. Actuator 212 may include any now known or later developed form of linear actuator configured to move loading platform 210 between the user-access position (FIGS. 1, 9, 10, 12) and loading position (FIG. 11) along one or more linear guide tracks 214. For example, actuator 212 may include a pneumatic, hydraulic, or electric linear actuator operable manually or under control of computer 106. Actuator 212 and tracks 214 may be coupled to component fixture 110 for lateral movement therewith. As defined herein, distal from component fixture 110 indicates loading platform 210 is farther away than when proximate to component fixture 110. In the examples shown, where machine enclosure 112 is provided, in the user-access position (FIGS. 1, 9, 10, 12), loading platform 210 is at least partially outside machine enclosure 112 of machining system 104 and is more readily user accessible than in the loading position. In the user-access position, actuator 212 has extended to move loading platform 210 away from component fixture 110 of machining system 104. Doors 114 of machine enclosure 112, where provided, are open in this setting. With loading platform 210 in the user-access position, turbine component 102 is free to be manually moved by a user, i.e., a human user (not shown). That is, a user can easily and safely without bending or extending their arms, manually place or remove turbine component 102 to/from loading platform 210. In contrast, in the loading position (FIG. 11), loading platform 210 is inside machine enclosure 112 of machining system 104. In the loading position, actuator 212 has retracted to move loading platform 210 adjacent to (proximate to) component fixture 110 of machining system 104. Doors 114 of machine enclosure 112, where provided, can be closed in this setting. The user-access position and loading position can be controlled by, among other things, controlling actuator 212 extension/retraction between its limits, by the extend and retract limits of actuator 212 and/or by set detents on actuator 212 and/or tracks 214, where the latter is provided.

It will be recognized that loading system 132 may include alternative structure(s) for moving loading platform 210 between the user-access position and the loading position than a linear actuator and tracks, such as but not limited to structure and actuators arranged in a pivoting arrangement or a parallelogram arrangement.

In the loading position, shown in FIG. 11, gripper 130 and tool handler 120 can, without user intervention, place or remove turbine component 102 to/from component fixture 110. More particularly, as will be described further herein, with loading platform 210 in the loading position (FIG. 11), tool handler 120 moves gripper 130 between a first handler position over loading platform 210 in which gripper 130 moves between the release position and the grasp position to grasp or ungrasp turbine component 102 for movement of turbine component 102 toward or away from loading platform 210, and a second handler position over component fixture 110 in which gripper 130 moves between the release position and the grasp position to grasp or ungrasp turbine component 102 for movement of turbine component 102 to or from component fixture 110.

In certain embodiments, all movement of handling system 100 is controlled by computer 106. More particularly, loading platform 210 moves between the user-access position and the loading position and gripper 130 moves between the first handler position, the second handler position, the release position, and the grasp position in an automated manner as part of a set of component machining instructions for machining system 104. The actual machining by machining system 104 occurs between activity by handling system 100.

Operation of handling system 100 in conjunction with machining system 104 will now be described. FIGS. 13-22 show additional perspective views of handling system 100 in operation from within machine enclosure 112. Handling system 100 may operate as part of an automated method of handling turbine component 102 relative to machining system 104, which may be precede and follow any now known or later developed automated method of machining turbine component 102 with machining system 104.

Loading Prior to Machining:

To initiate the method, as shown in FIGS. 1, 9, 10 and 12, loading platform 210 is positioned in the user-access position distal from component fixture 110 of machining system 104, whereby a user manually loads turbine component 102 (FIG. 9 only) to loading platform 210. Doors 114 of machine enclosure 112, if provided, are open to allow loading platform 210 to extend to the user-access position. In the user-access position, loading platform 210 is at least partially outside machine enclosure 112 of computerized machining system 104, i.e., with doors 114 open. A user may manually place turbine component 102 on loading platform 210, where holders 218 may operate to positively locate turbine component 102 in a predefined location, e.g., relative to the rest of loading platform 210, for easy locating by gripper 130 in subsequent steps.

FIG. 11 shows positioning loading platform 210 with turbine component 102 in the loading position proximate component fixture 110. In this step, actuator 212 of loading system 132 retracts, forcing loading platform 210 to move towards component fixture 110. One or more guide tracks 214, where provided, may direct the linear movement of loading platform 210. As noted, loading system 132 may include alternative structure and actuators to provide the described movement of loading platform 210. As loading platform 210 moves to the loading position or thereafter, doors 114 of machine enclosure 112 close. Where actuator 212 is not provided, a user may manually place turbine component 102 on loading platform 210 in the loading position shown in FIG. 11, where holders 218 may operate as previously described.

Figure 13:
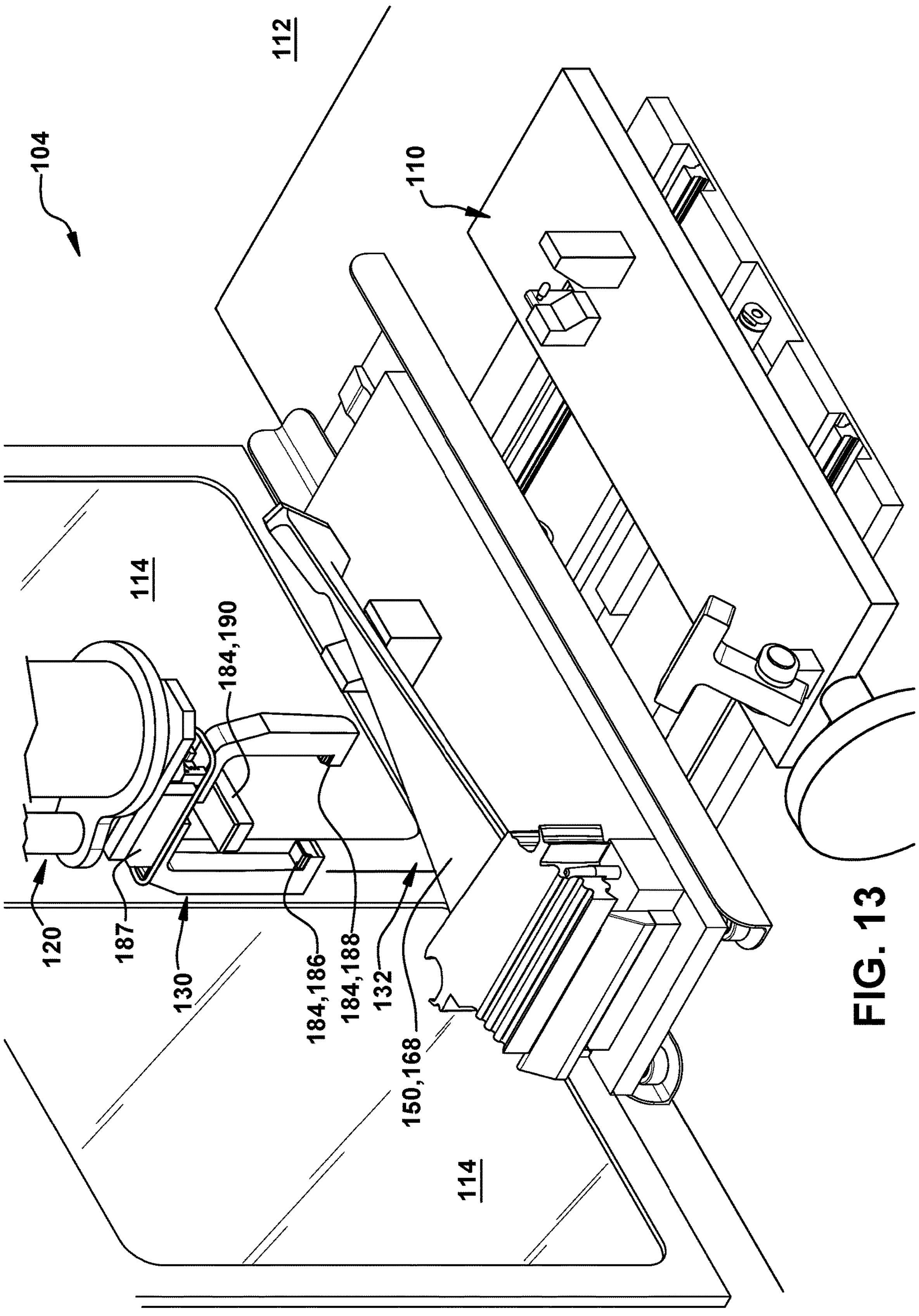
FIG. 13 shows a perspective view of a gripper of the handling system (from within a machine enclosure of the machining system) in the loading position of the loading platform, according to embodiments of the disclosure.
Figure 14:
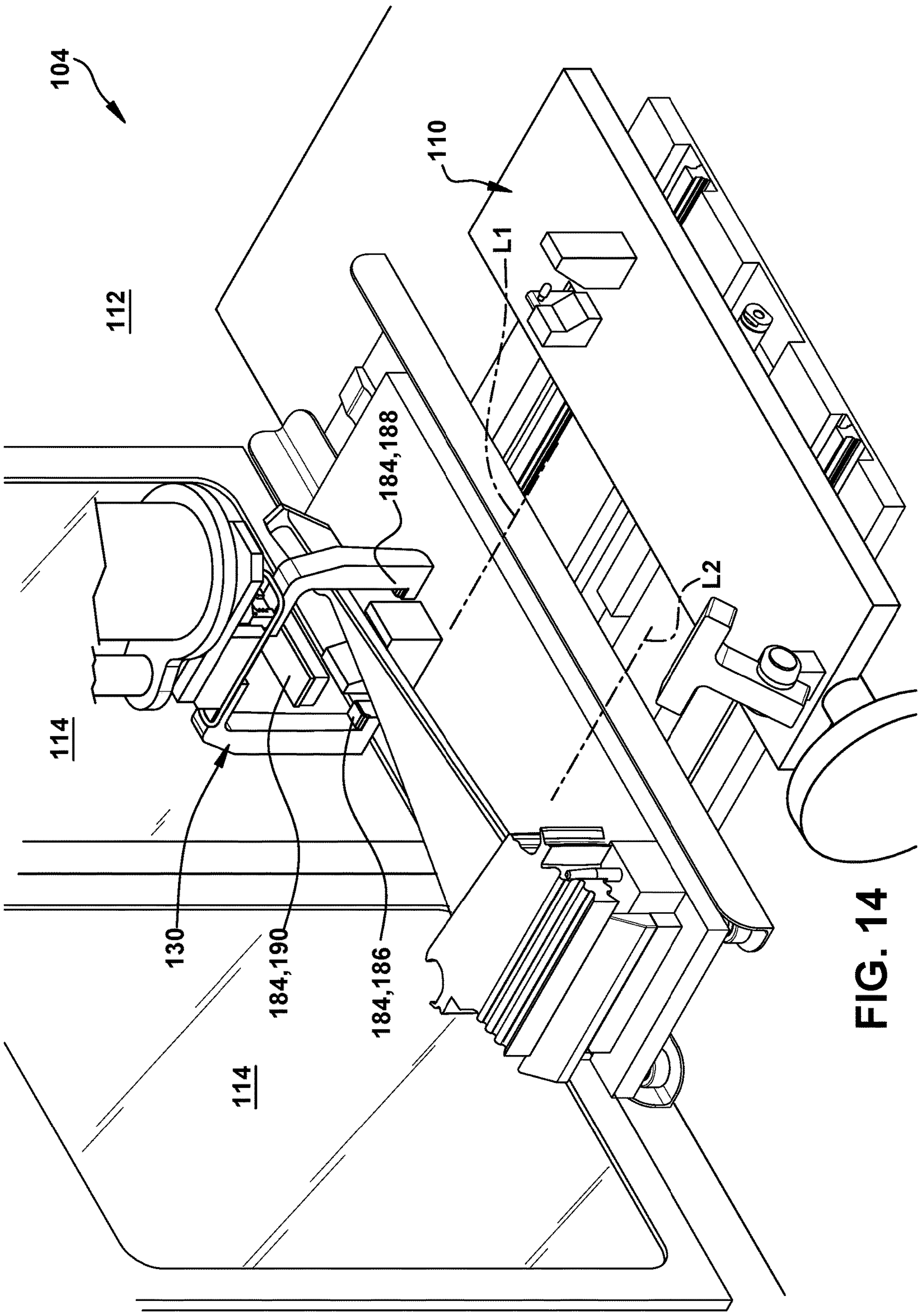
FIG. 14 shows a perspective view of the gripper (from within a machine enclosure of the machining system) in a released position over a first longitudinal position of a turbine component in the loading position of the loading platform, according to embodiments of the disclosure.

FIGS. 13-19 show moving turbine component 102 to/from loading platform 210 and to/from component fixture 110 of computerized machining system 104 using gripper 130. As noted, gripper 130 has contact members 184 configured to collectively grasp turbine component 102 and is operatively coupled to tool handler 120 of computerized machining system 104. FIGS. 13 and 14 show gripper 130 in the release position relative to turbine component 102, i.e., with gripper 130 not engaged to hold turbine component 102, which is resting on loading platform 210. In FIG. 13, gripper 130 has been selected by tool handler 120 from tool carrier 124 (FIG. 1) through an opening (not shown) in machine enclosure 112 in a known fashion and has been positioned over turbine component 102 in the loading position on loading platform 210. The position of turbine component 102 on loading platform 210 is predefined by component holders 218 thereon so gripper 130 can grasp it without any further identification of location thereof. However, if necessary, in alternative embodiments, gripper 130 can include, for example, physical or optical probes to confirm positioning of turbine component 102 on loading platform 210. In the loading position, loading platform 210 is inside machine enclosure 112, if provided, of computerized machining system 104.

FIG. 14 shows tool handler 120 lowering gripper 130 over first longitudinal position L1 of turbine component 102. As described, distance D1 (FIG. 7) between fixed contact members 186, 188 is sufficiently wide to allow fixed contact members 186, 188 to cross-sectionally pass over airfoil 150, 168 in first longitudinal position L1 of airfoil 150, 168. In an alternative embodiment, and where turbine component 102 geometry allows, gripper 130 could be passed longitudinally over, for example, outboard tip 161 (FIG. 2) of airfoil 150 of a turbine blade 138 (FIG. 2) with no tip shroud. In this manner, contact members 186, 188 can be positioned in first longitudinal position L1 without passing cross-sectionally over airfoil 150.

Figure 15:
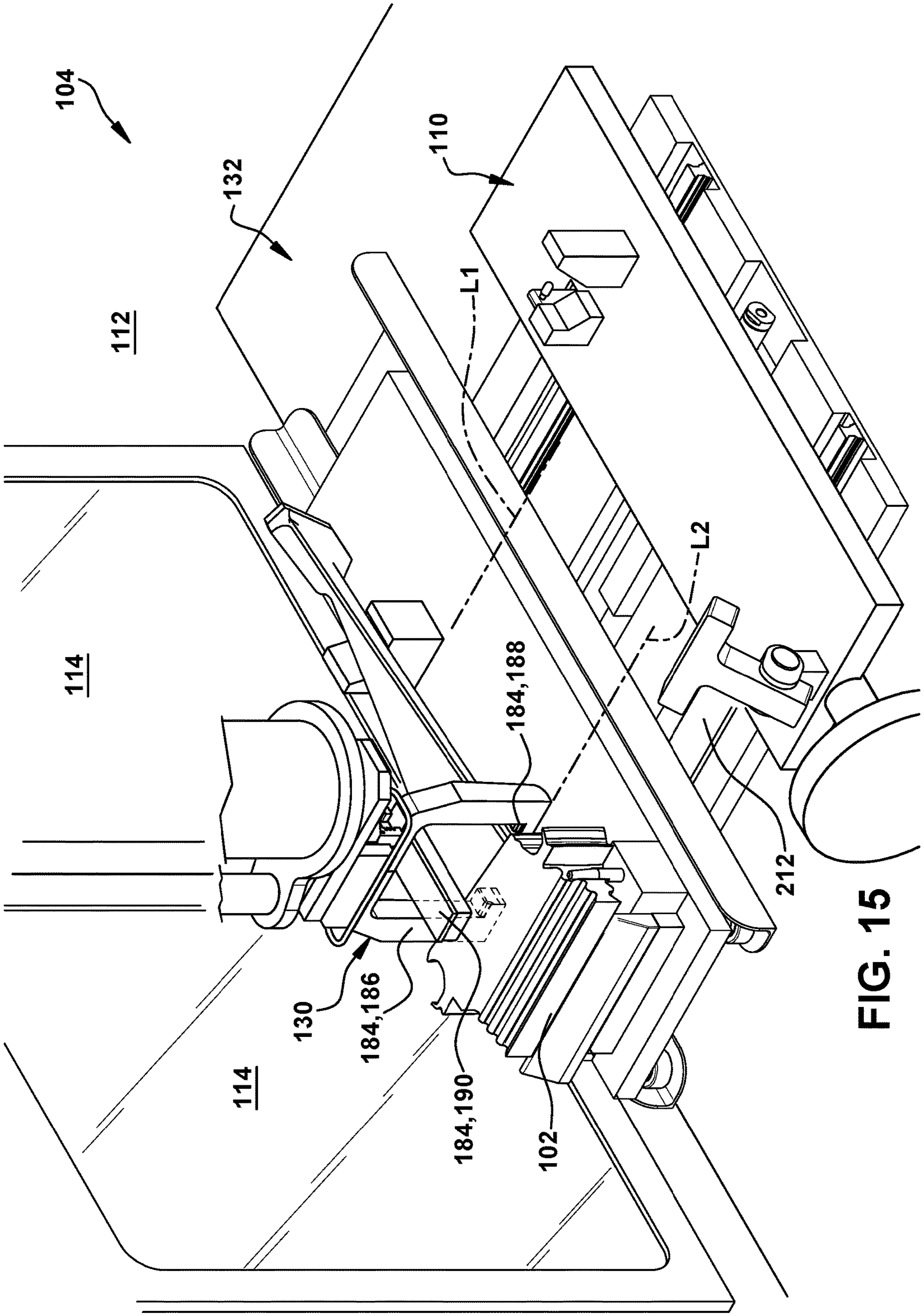
FIG. 15 shows a perspective view of the gripper (from within a machine enclosure of the machining system) in a grasp position over a second longitudinal position of the turbine component and over the loading platform, according to embodiments of the disclosure.

In any event, as shown in FIGS. 14 and 15, tool handler 120 and/or component fixture 110 next linearly move gripper 130 relative to turbine component 102, such that gripper 130 moves between first longitudinal position L1 and second longitudinal position L2. In the example shown, component fixture 110 and, hence, turbine component 102 is moved away from the viewer on the page to move gripper 130 between first longitudinal position L1 and second longitudinal position L2. In this case, turbine component 102 on component fixture 110 is moved to place gripper 130 over second longitudinal position L2. Alternatively, or in addition thereto, tool handler 120 can also move gripper 130 during this process, if desired. Contact members 184 generally do not contact airfoil 150, 168 during this movement, other than perhaps some minor sliding contact near the end of the movement.

Figure 16:
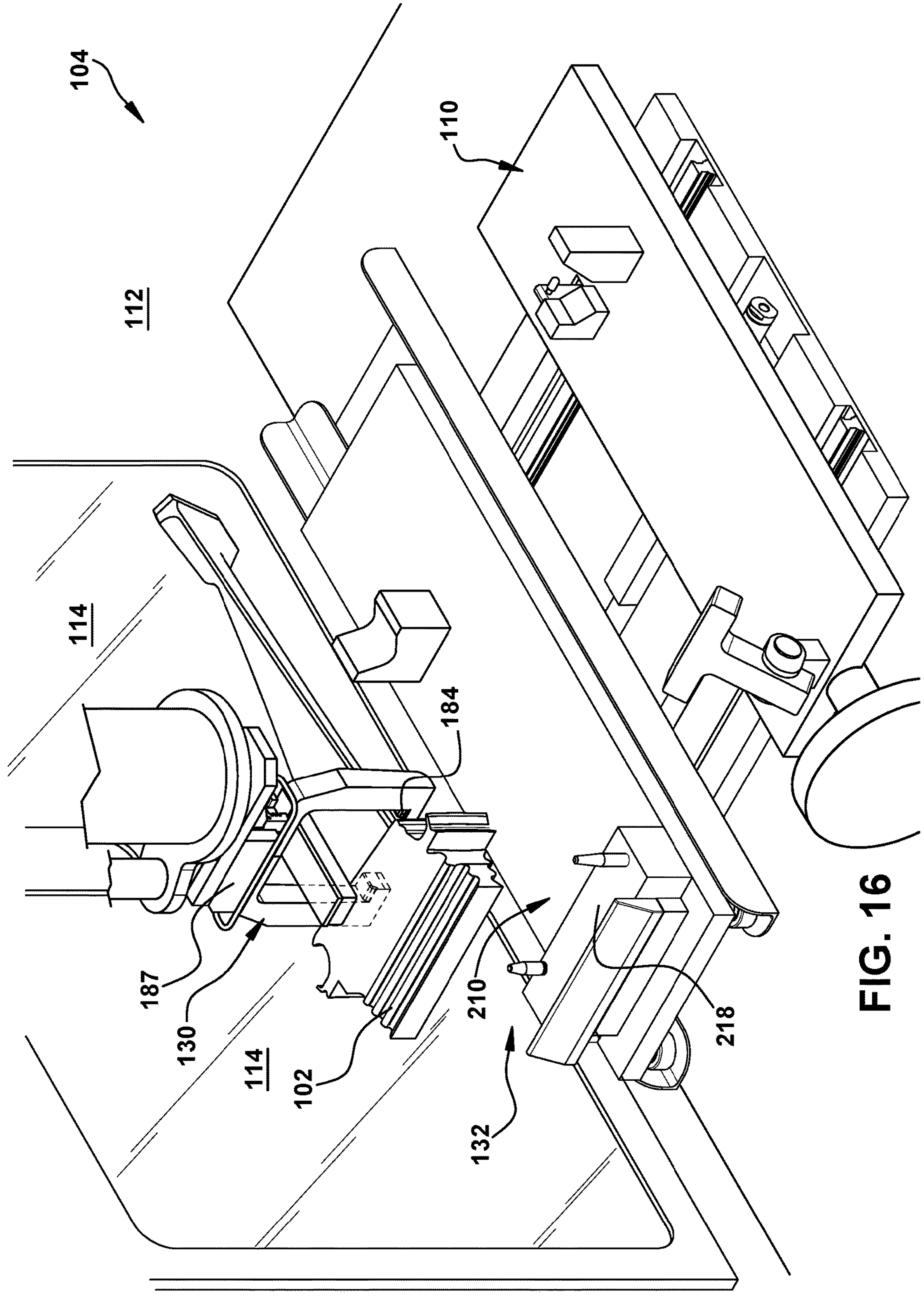
FIG. 16 shows a perspective view of the gripper (from within a machine enclosure of the machining system) moving the turbine component to or from the loading position of the loading platform, according to embodiments of the disclosure.
Figure 17:
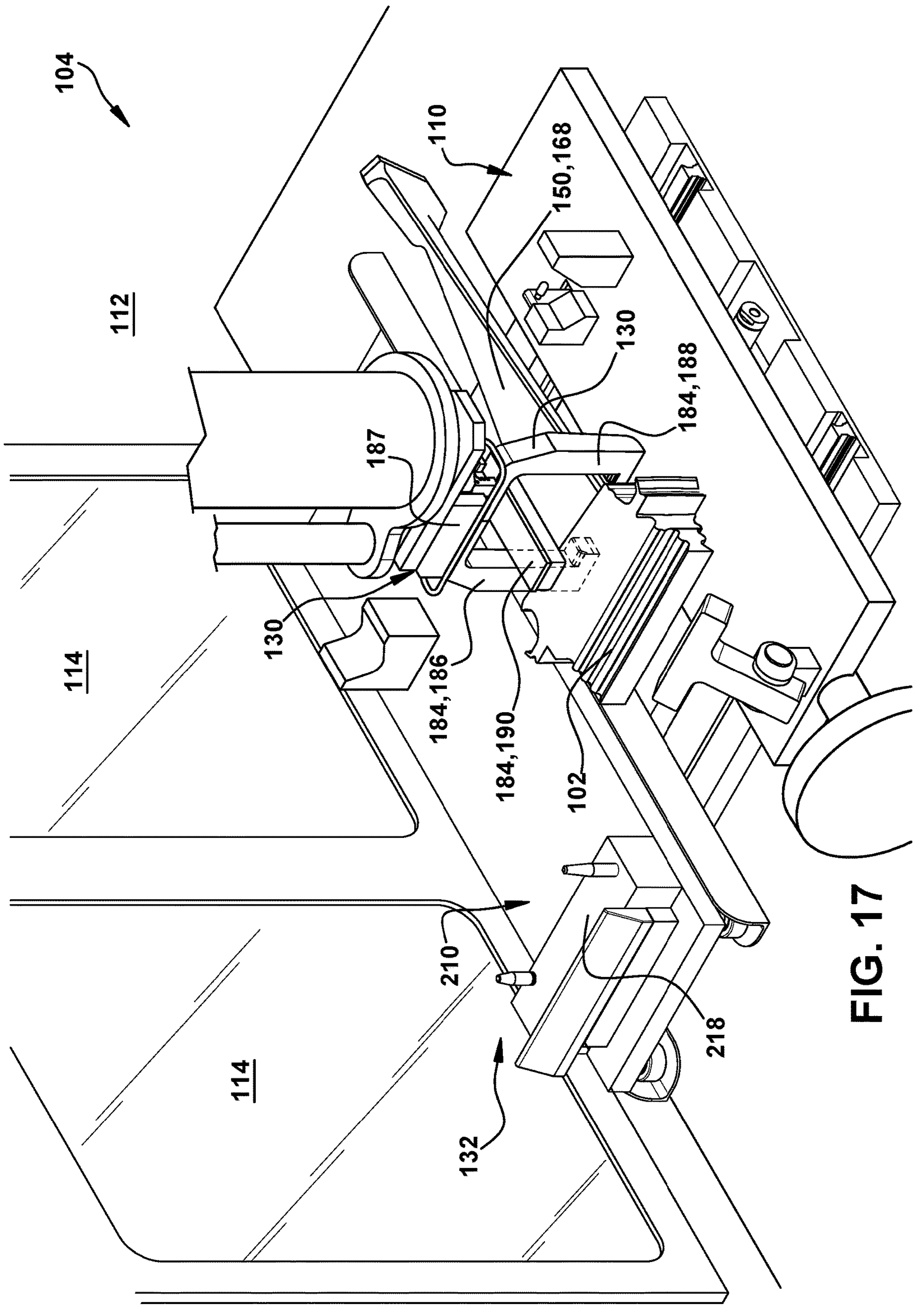
FIG. 17 shows a perspective view of the gripper (from within a machine enclosure of the machining system) moving the turbine component to or from the component fixture of the machining system, according to embodiments of the disclosure.
Figure 18:
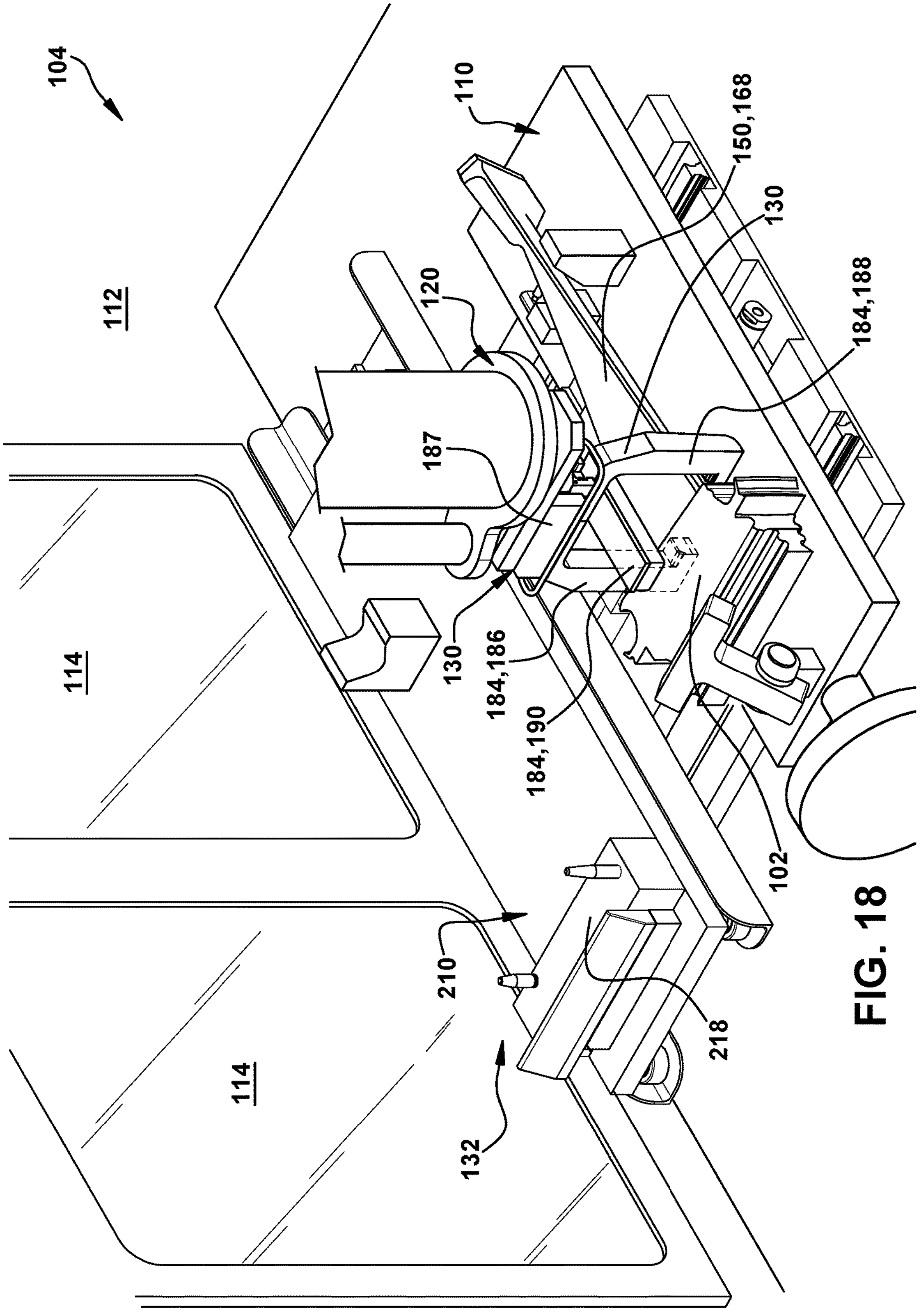
FIG. 18 shows a perspective view of the gripper (from within a machine enclosure of the machining system) in a grasp position over a second longitudinal position of the turbine component and over the component fixture of the machining system, according to embodiments of the disclosure.

FIGS. 15-18 show tool handler 120 moving gripper 130. As shown in FIGS. 15-18, tool handler 120 moves gripper 130 between a first handler position over loading platform 210 and a second handler position over component fixture 110. FIGS. 15-16 show tool handler 120 and gripper 130 in the first handler position over loading platform 210 in which gripper 130 can move between the release position and the grasp position to grasp or ungrasp the turbine component 102 for movement of turbine component 102 to or from loading platform 210. FIGS. 17-18 show tool handler 120 and gripper 130 in the second handler position over component fixture 110 in which gripper 130 moves between the release position and the grasp position to grasp or ungrasp turbine component 102 for movement of turbine component 102 to or from component fixture 110.

The movements of tool handler 120 and gripper 130 between the first and second handler positions will now be described in more detail.

FIG. 15 shows gripper 130 in the grasp position over loading platform 210 with actuator 187 actuated to extend moveable contact member 190 into contact with turbine component 102 at or near longitudinal position L2. In this setting, turbine component 102 is firmly secured and movable by gripper 130.

FIG. 16 shows lifting of turbine component 102 from loading platform 210 with gripper 130. Here, tool handler 120 raises up (vertically on page) lifting gripper 130 and turbine component 102.

FIG. 17 shows moving turbine component 102 over component fixture 110 of machining system 104. Here, tool handler 120 and/or component fixture 110 move in a manner to place turbine component 102 over component fixture 110. That is, generally speaking, tool handler 120 moves to the right on the page and/or component fixtures 110 moves left on the page. One or both of tool handler 120 and component fixture 110 may also move into or out of the page to longitudinally align tool component 102 in a desired position over component fixture 110.

FIG. 18 shows lowering of turbine component 102 onto component fixture 110. Here, tool handler 120 lowers down (vertically on page) lowering gripper 130 and turbine component 102. Once in the position in FIG. 18, actuator 187 of gripper 130 retracts moveable contact member 190 to a retracted position, placing gripper 130 into the release position over component fixture 110.

Figure 19:
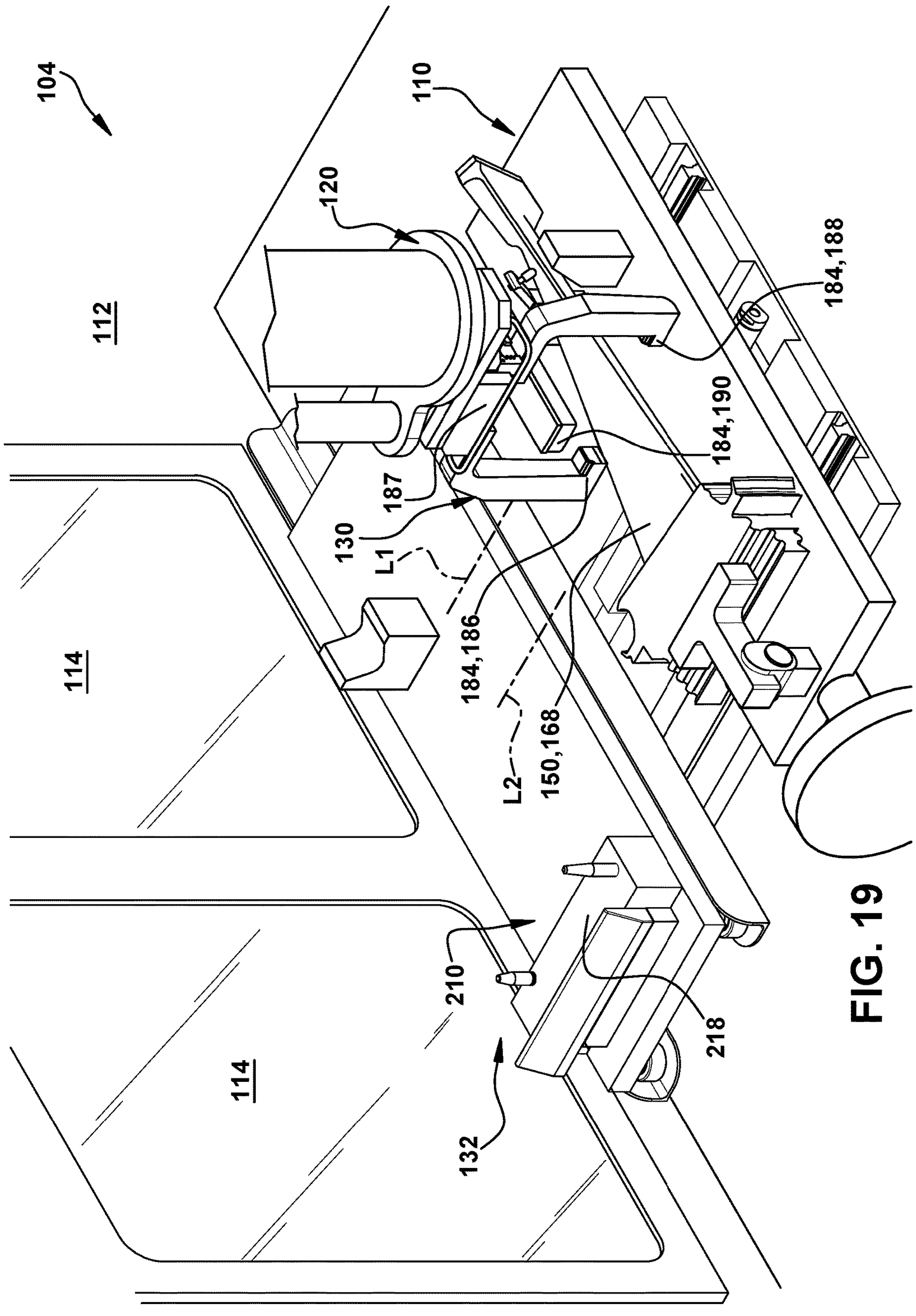
FIG. 19 shows a perspective view of the gripper (from within a machine enclosure of the machining system) in a release position over a first longitudinal position of the turbine component and over the component fixture of the machining system, according to embodiments of the disclosure.

In FIG. 19, tool handler 120 and/or component fixture 110 next linearly move turbine component 102 to move gripper 130 relative to turbine component 102 between second longitudinal position L2 and first longitudinal position L1. In the example shown, generally, turbine component 102 on component fixture 110 is moved towards the viewer on the page to move gripper 130 between second longitudinal position L2 and first longitudinal position L1. Alternatively, or in addition thereto, tool handler 120 can also move gripper 130 during this process, if desired. Contact members 184 are released from contact with airfoil 150, 168 during this movement, other than perhaps some minor sliding contact near the start of the movement.

Component fixture 110 may include any now known or later developed structures to grasp turbine component 102. As known in the art, component fixture 110 can also move turbine component 102 in any manner, e.g., horizontally, vertically and/or tilting, using any necessary actuators controlled by computer 106.

Figure 20:
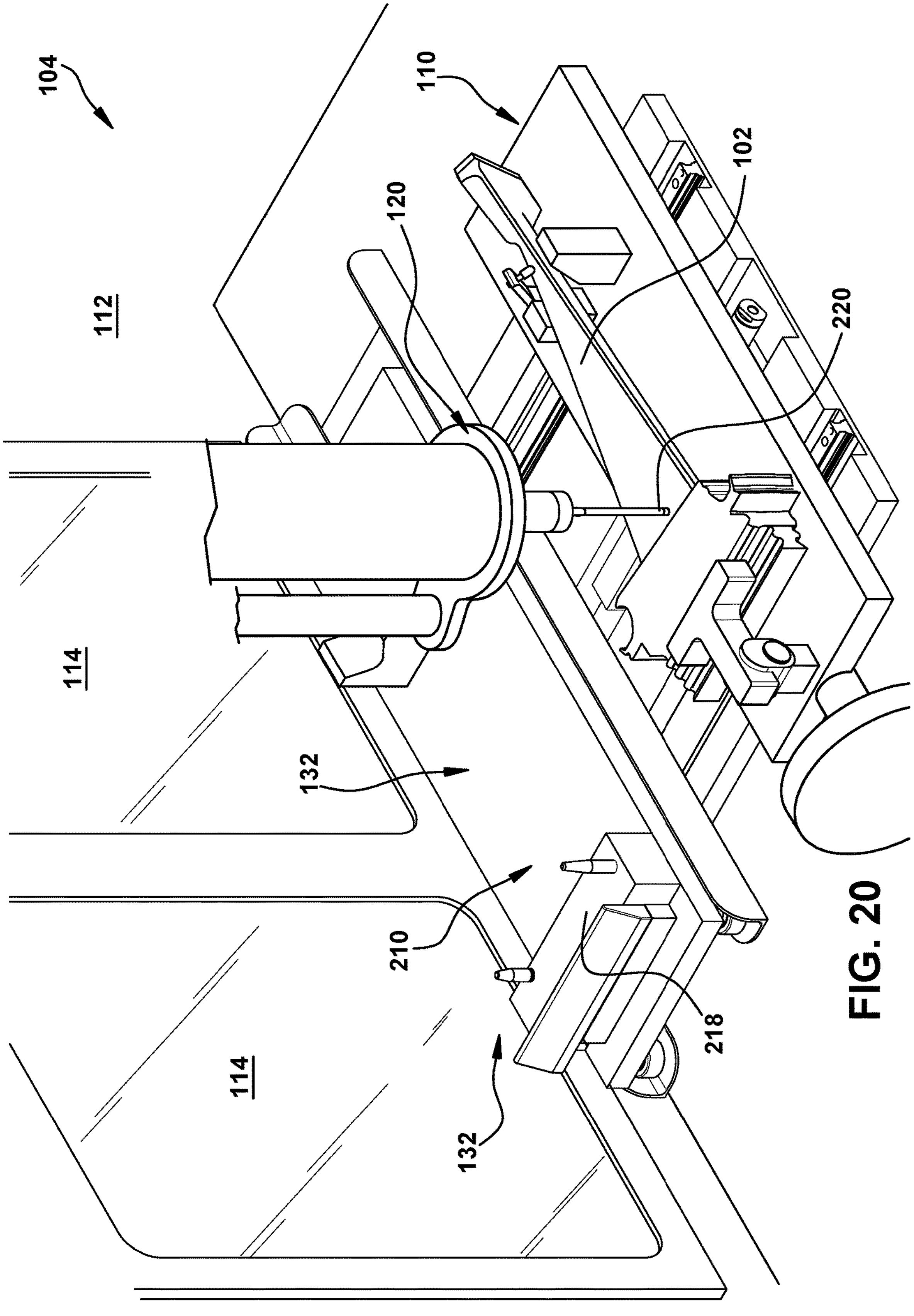
FIG. 20 shows a perspective view of a physical or optical probe (from within a machine enclosure of the machining system) confirming a position of the turbine component on the component fixture, according to embodiments of the disclosure.
Figure 21:
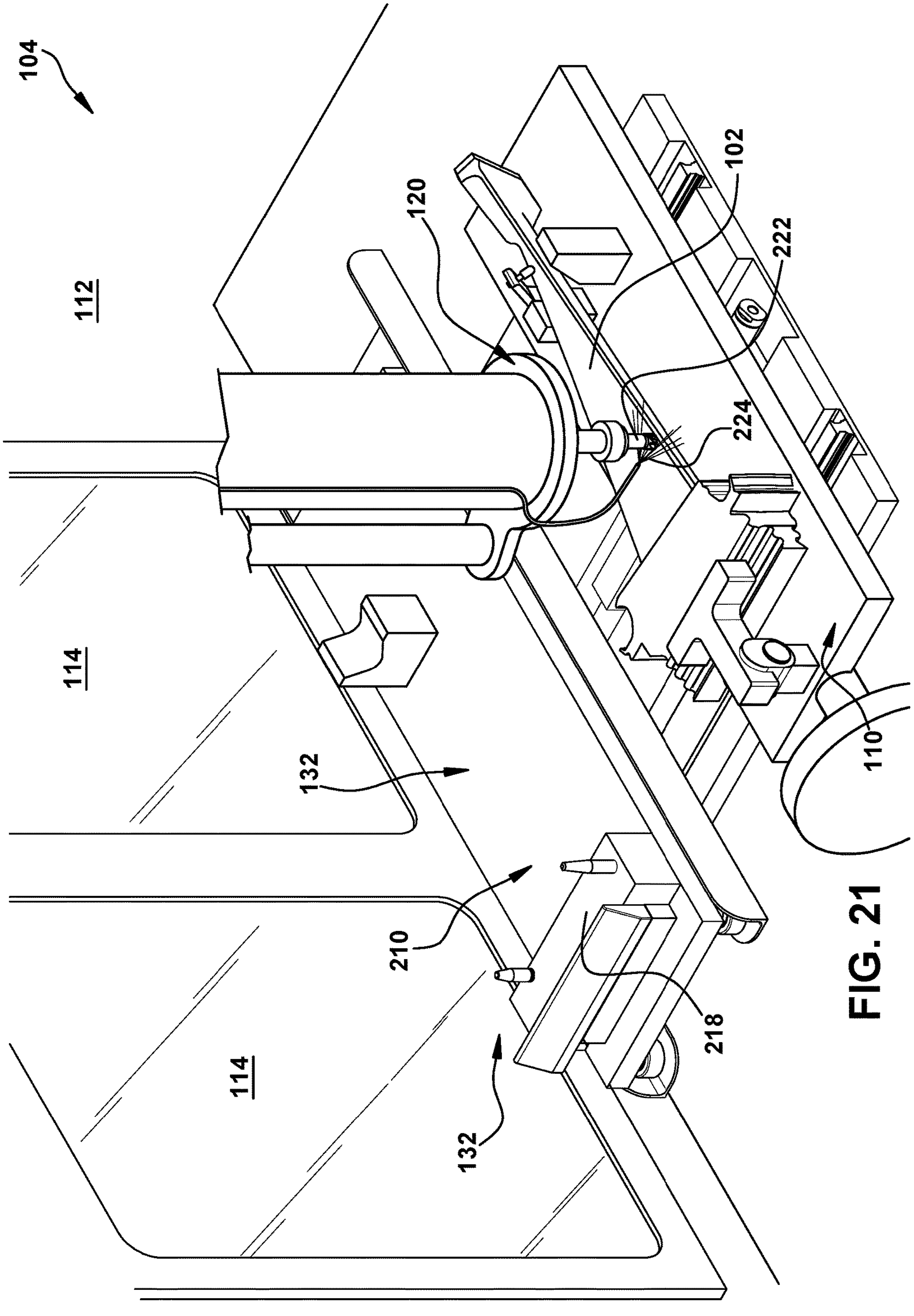
FIG. 21 shows a perspective view of a machining tool (from within a machine enclosure of the machining system) machining the turbine component on the component fixture, according to embodiments of the disclosure.

Machining:

FIG. 20-21 show various operations of machining system 104, with FIG. 21 showing machining turbine component 102 based on a set of component machining instructions. In FIG. 20, tool handler 120 has switched out gripper 130 for, for example, a conventional physical or optical probe 220, which can be used in an optional step to confirm positioning of turbine component 102 on component fixture 110. In FIG. 21, tool handler 120 has switched out probe 220 for a machining tool 222. The machining shown in FIG. 21 may include using any now known or later developed process of machining system 104 as directed by a set of component machining instructions. In the one example shown, machining tool 222 includes a milling head, and coolant 224 is being delivered to tool 222. As known in the art, tool handler 120 and/or component fixture 110 would be moved to move tool 222 in contact with turbine component 102 to perform the machining. Tool 222 is shown above and out of contact with tool component for illustration purposes, it may not be visible during the machining. After machining, tool handler 120 can optionally select from a variety of post-machining processing tools from tool carrier 124 (FIG. 1), for cleaning machining debris, removing contaminants and/or drying the component using air jets or high-speed fans.

Unloading after Machining:

After the machining, the above-described handling process for loading turbine component 102 is reversed to allow unloading of turbine component 102. The drawings will be referenced in reverse numerical order in order to describe this process. The process includes moving turbine component 102 from component fixture 110 of computerized machining system 104 to loading platform 210 using gripper 130 operatively coupled to tool handler 120 of computerized machining system 104. More particularly, as shown in FIG. 19, tool handler 120 switches out machining tool 222 (FIG. 20) and selects gripper 130. FIG. 19 shows lowering of gripper 130 over turbine component 102. Here, tool handler 120 lowers down (vertically on page) lowering gripper 130 over turbine component 102. In the position in FIG. 19, actuator 187 of gripper 130 has moveable contact member 190 in a retracted position, i.e., with gripper 130 in the release position over component fixture 110.

As shown in FIG. 18, tool handler 120 and/or component fixture 110 next linearly move turbine component 102 to move gripper 130 relative to turbine component 102 between first longitudinal position L1 and second longitudinal position L2. In the example shown, component fixture 110 is moved away from the viewer on the page to move gripper 130 between first longitudinal position L1 and second longitudinal position L2. Alternatively, or in addition thereto, tool handler 120 can also move gripper 130 during this process, if desired. Contact members 184 are released from contact with airfoil 150, 168 during this movement, other than perhaps some minor sliding contact near the end of the movement. FIG. 18 also shows gripper 130 in the grasp position over component fixture 110 with actuator 187 actuated to extend moveable contact member 190 into contact with turbine component 102 at or near longitudinal position L2. In this setting, turbine component 102 is firmly secured and movable by gripper 130.

FIG. 17 shows lifting of turbine component 102 from component fixture 110. Here, tool handler 120 raises up (vertically on page) lifting gripper 130 and turbine component 102.

FIG. 16 shows moving turbine component 102 from over component fixture 110 of machining system 104. Here, tool handler 120 and/or component fixture 110 move in a manner to place turbine component 102 over loading platform 210. That is, generally speaking, tool handler 120 moves to the left on the page and/or component fixtures 110 moves right on the page. One or both of tool handler 120 and component fixture 110 may also move into or out of the page to longitudinally align tool component 102 in a desired position over loading platform 210, e.g., over component holders 218.

FIG. 15 shows lowering of turbine component 102 onto loading platform 210. Here, tool handler 120 lowers down (vertically on page) lowering gripper 130 and turbine component 102. In the position in FIG. 15, actuator 187 of gripper 130 moves moveable contact member 190 to a retracted position, placing gripper 130 into the release position over loading platform 210.

In FIG. 14, tool handler 120 and/or component fixture 110 next linearly move turbine component 102 to move gripper 130 relative to turbine component 102 between second longitudinal position L2 and first longitudinal position L1. In the example shown, generally, component fixture 110 is moved towards the viewer on the page to move gripper 130 between second longitudinal position L2 and first longitudinal position L1. Alternatively, or in addition thereto, tool handler 120 can also move gripper 130 during this process, if desired. Contact members 184 are released from contact with airfoil 150, 168 during this movement, other than perhaps some minor sliding contact near the start of the movement.

In FIG. 13, with gripper 130 in the release position relative to turbine component 102, i.e., with gripper 130 not engaged to hold turbine component 102, which is again resting on loading platform 210, tool handler 120 can raise gripper 130 in the first longitudinal position L1, leaving turbine component 102 on loading platform 210.

FIGS. 1 and 9 show positioning loading platform 210 in the user-access position distal from component fixture 110 of machining system 104. In this position, a user can manually unload turbine component 102 from loading platform 210. That is, with loading platform 210 again positioned in the user-access position distal from component fixture 110 of machining system 104, a user can manually unload turbine component 102 from loading platform 210. Doors 114 of machine enclosure 112, if provided, are open to allow loading platform 210 to extend to the user-access position. In the user-access position, loading platform 210 is at least partially outside machine enclosure 112 of computerized machining system 104, i.e., with doors 114 open. A user may manually remove turbine component 102 from loading platform 210 in any known position. Where actuator 212 for loading system 132 is not provided, a user can manually remove turbine component from loading platform 210 in the loading position shown in FIG. 11 (with doors 114 open, if provided).

Embodiments of the disclosure provide various technical and commercial advantages, examples of which are discussed herein. The handling system allows easier loading and unloading of heavy or complex shaped turbine components, like turbine blades or nozzles with airfoils, without extensive bending over and/or extending while holding the turbine component. The handling system is advantageous on machining systems with a machine enclosure, but can also be helpful on machining systems without a machine enclosure.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function members in the claims below are intended to include any structure, material, or act for performing the function in combination with other claimed members as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A handling system for a turbine component relative to a computerized machining system, the handling system comprising:

a gripper including:

a mounting arm configured to be operatively coupled to a tool handler of the computerized machining system, a plurality of contact members configured to collectively grasp the turbine component, wherein each of the plurality of contact members are vertically and horizontally spaced apart from each other, and wherein a first contact member of the plurality of contact members extends from the mounting arm at a length different from a second contact member of the plurality of contact members defining a vertical spacing to allow passage of a part of the turbine component therebetween at a first longitudinal position of the part of the turbine component and prevent passage of the part of the turbine component therebetween at a second longitudinal position of the part of the turbine component, different than the first longitudinal position, and a first actuator configured to move a third contact member of the plurality of contact members between a release position in which the plurality of contact members receive the part of the turbine component therebetween at the first longitudinal position of the part of the turbine component and a grasp position in which the plurality of contact members grasp the part of the turbine component at the second longitudinal position, wherein at least one of the tool handler and the turbine component is linearly moved to move the gripper relative to the turbine component between the first longitudinal position and the second longitudinal position.

2. The handling system of claim 1, further comprising a loading system including a loading platform and a second actuator configured to move the loading platform between a user-access position distal from a component fixture of the computerized machining system and a loading position proximate the component fixture of the computerized machining system.

3. The handling system of claim 2, further comprising one or more linear guide tracks mounting the loading platform for lateral movement relative to the component fixture, wherein the second actuator includes a linear actuator configured to move the loading platform between the user-access position and the loading position along the one or more linear guide tracks.

4. The handling system of claim 2, wherein, in the user-access position, the loading platform is at least partially outside a machine enclosure of the computerized machining system and, in the loading position, the loading platform is inside the machine enclosure of the computerized machining system.

5. The handling system of claim 4, wherein, with the loading platform in the loading position, the tool handler moves the gripper between:

a first handler position over the loading platform in which the gripper moves between the release position and the grasp position to grasp or ungrasp the turbine component for movement of the turbine component to or from the loading platform; and a second handler position over the component fixture in which the gripper moves between the release position and the grasp position to grasp or ungrasp the turbine component for movement of the turbine component to or from the component fixture.

6. The handling system of claim 5, wherein the loading platform moves between the user-access position and the loading position and the gripper moves between the first handler position, the second handler position, the release position, and the grasp position in an automated manner as part of a set of component machining instructions for the computerized machining system.

7. The handling system of claim 2, wherein, with the loading platform in the loading position, the tool handler moves the gripper between:

a first handler position over the loading platform in which the gripper moves between the release position and the grasp position to grasp or ungrasp the turbine component for movement of the turbine component to or from the loading platform; and a second handler position over the component fixture in which the gripper moves between the release position and the grasp position to grasp or ungrasp the turbine component for movement of the turbine component to or from the component fixture.

8. The handling system of claim 2, wherein, with the loading platform in the user-access position, the turbine component is free to be manually moved by a user.

9. The handling system of claim 1, wherein the first actuator includes a pneumatic actuator.

10. The handling system of claim 1, wherein the first contact member is fixed relative to the mounting arm, and the second contact member fixed relative to the mounting arm.

11. An automated method of handling a turbine component relative to a computerized machining system, the automated method comprising:

positioning a loading platform in a user-access position distal from a component fixture of the computerized machining system, whereby a user manually loads the turbine component to the loading platform;

positioning the loading platform with the turbine component in a loading position proximate the component fixture;

moving the turbine component from the loading platform to a component fixture of the computerized machining system using a gripper having a plurality of contact members configured to collectively grasp the turbine component, the gripper operatively coupled to a tool handler of the computerized machining system, wherein each of the plurality of contact members are vertically and horizontally spaced apart from each other, and wherein a first contact member of the plurality of contact members extends from the mounting arm at a length different from a second contact member of the plurality of contact members defining a vertical spacing to allow passage of a part of the turbine component therebetween at a first longitudinal position of the part of the turbine component and prevent passage of the part of the turbine component therebetween at a second longitudinal position of the part of the turbine component, different than the first longitudinal position; and machining the turbine component using the computerized machining system and a set of component machining instructions, wherein the gripper includes a first actuator configured to move a third contact member of the plurality of contact members between a release position in which the plurality of contact members receive the part of the turbine component therebetween at the first longitudinal position of the part of the turbine component and a grasp position in which the plurality of contact members grasp the part of the turbine component at the second longitudinal position of the part.

12. The automated method of claim 11, further comprising, after the machining:

moving the turbine component from the component fixture of the computerized machining system to the loading platform using the gripper operatively coupled to the tool handler of the computerized machining system; and positioning the loading platform in the user-access position distal from the component fixture of the computerized machining system, whereby a user manually unloads the turbine component from the loading platform.

13. The automated method of claim 11, further comprising linearly moving at least one of the tool handler and the turbine component to move the gripper relative to the turbine component between the first longitudinal position and the second longitudinal position.

14. The automated method of claim 13, further comprising one or more linear guide tracks for mounting the loading platform for lateral movement relative to the component fixture, and further comprising a second actuator configured to move the loading platform between the user-access position and the loading position along the one or more linear guide tracks.

15. The automated method of claim 13, wherein the first actuator includes a pneumatic actuator.

16. The automated method of claim 11, wherein, in the user-access position, the loading platform is at least partially outside a machine enclosure of the computerized machining system and, in the loading position, the loading platform is inside the machine enclosure of the computerized machining system.

17. The automated method of claim 11, wherein, with the loading platform in the loading position, the tool handler moves the gripper between:

a first handler position over the loading platform in which the gripper moves between a release position and the grasp position to grasp or ungrasp the turbine component for movement of the turbine component to or from the loading platform; and a second handler position over the component fixture in which the gripper moves between the release position and the grasp position to grasp or ungrasp the turbine component for movement of the turbine component to or from the component fixture.

18. A gripper for a handling system for a turbine component including an airfoil, the gripper comprising:

a mounting arm configured to be operatively coupled to a tool handler of a computerized machining system;

a first contact member fixed relative to the mounting arm;

a second contact member fixed relative to the mounting arm, wherein:

the first contact member extends to a first length from the mounting arm, and the second contact members extends from the mounting arm to a second length less than the first length, the difference between the first length and second length defining a vertical spacing, the first and second contact members have a horizontal spacing therebetween, and the vertical spacing and horizontal spacing between the first and second contact members are configured to allow passage of the airfoil therebetween at a first longitudinal position of the airfoil having a first width and prevent passage of the airfoil therebetween at a second longitudinal position of the airfoil having a second width greater than the first width;

a third contact member moveable between a grasp position contacting a portion of the turbine component and seating the turbine component against the first and second contact members and a release position out of contact with the turbine component and allowing movement of the turbine component relative to the first and second contact members; and an actuator moving the third contact member between the grasp position and the release position.

19. The gripper of claim 18, wherein the actuator includes a pneumatic actuator.

20. The gripper of claim 18, wherein the third contact member is vertically and horizontally spaced apart from the first contact member and the second contact member.

* * * * *